(12) United States Patent
Tsuchiya et al.

(10) Patent No.: US 8,102,609 B2
(45) Date of Patent: Jan. 24, 2012

(54) LENS BARREL AND IMAGE PICKUP UNIT

(75) Inventors: Takahiro Tsuchiya, Aichi (JP); So Miyasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 322 days.

(21) Appl. No.: 12/314,635

(22) Filed: Dec. 15, 2008

(65) Prior Publication Data

US 2009/0185291 A1   Jul. 23, 2009

(30) Foreign Application Priority Data

Jan. 23, 2008   (JP) ................. 2008-012575

(51) Int. Cl.
*G02B 7/02* (2006.01)

(52) U.S. Cl. .................. 359/819; 359/813; 359/811

(58) Field of Classification Search .................. 359/819
See application file for complete search history.

(56) References Cited

U.S. PATENT DOCUMENTS

| | | | |
|---|---|---|---|
| 6,829,111 B2 * | 12/2004 | Fujisawa et al. | 359/822 |
| 6,870,693 B2 * | 3/2005 | Ito | 359/819 |
| 7,046,461 B2 * | 5/2006 | Yamaguchi et al. | 359/819 |
| 7,127,161 B2 | 10/2006 | Koyama et al. | |
| 7,391,571 B2 | 6/2008 | Lee et al. | |
| 2001/0012162 A1 * | 8/2001 | Kato et al. | 359/822 |
| 2005/0264900 A1 * | 12/2005 | Ishida et al. | 359/811 |
| 2006/0291076 A1 * | 12/2006 | Watanabe et al. | 359/811 |

FOREIGN PATENT DOCUMENTS

| | | |
|---|---|---|
| JP | 04-109734 U | 4/1992 |
| JP | 09-035312 A | 2/1997 |
| JP | 10-311904 | 11/1998 |
| JP | 2002-350702 | 12/2002 |
| JP | 2003-153091 A | 5/2003 |
| JP | 2004-088181 | 3/2004 |
| JP | 2005-091520 | 4/2005 |
| JP | 2005-121859 A | 5/2005 |
| JP | 2005-134672 A | 5/2005 |
| JP | 2005-309289 | 11/2005 |
| JP | 2005-352314 A | 12/2005 |
| JP | 2006-313185 A | 11/2006 |
| JP | 2007-094103 A | 4/2007 |

OTHER PUBLICATIONS

Japanese Office Action issued Nov. 5, 2009 for corresponding Japanese Application No. 2008-012575.

* cited by examiner

*Primary Examiner* — Ricky Mack
*Assistant Examiner* — Brandi Thomas
(74) *Attorney, Agent, or Firm* — Rader, Fishman & Grauer PLLC

(57) ABSTRACT

Disclosed herein is a lens barrel including: a plurality of lenses arranged in a state of being separated from each other in a direction of an optical axis; and a lens retaining body for retaining the lenses; wherein a print pattern that has a light shielding function and is partly in contact with the lens retaining body to adjust an interval between the lenses in the direction of the optical axis is formed on at least one of the plurality of lenses.

20 Claims, 18 Drawing Sheets

FIG. 19
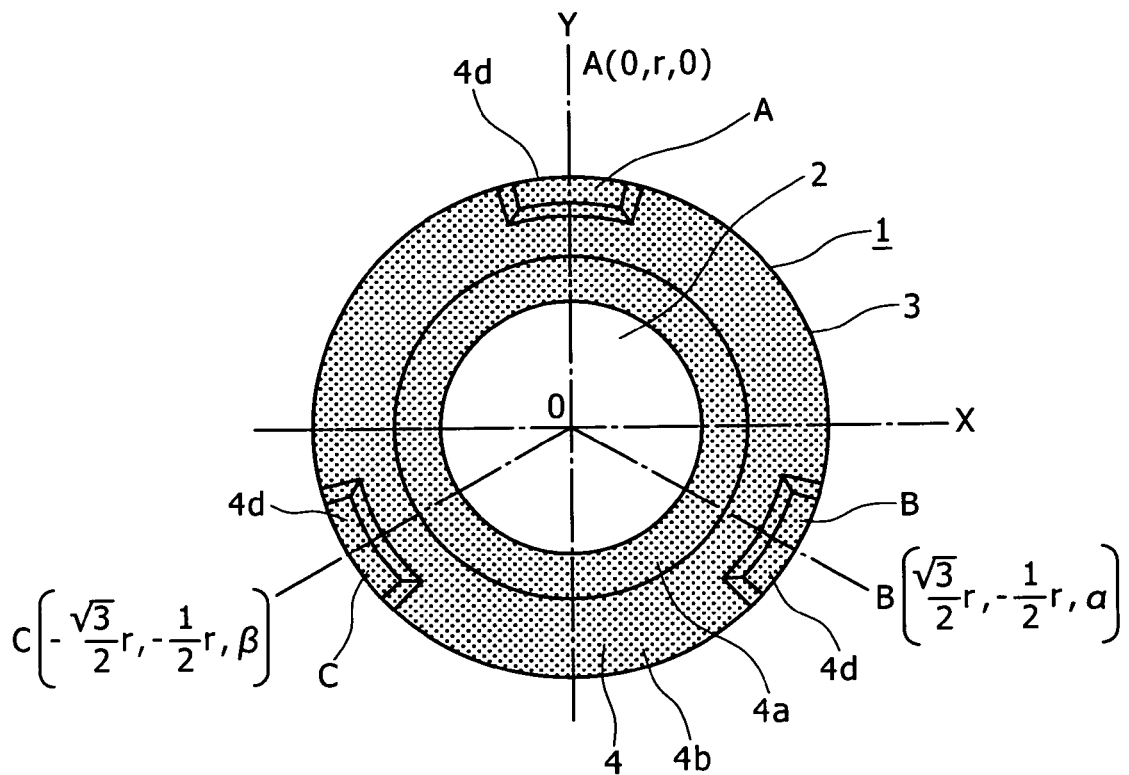
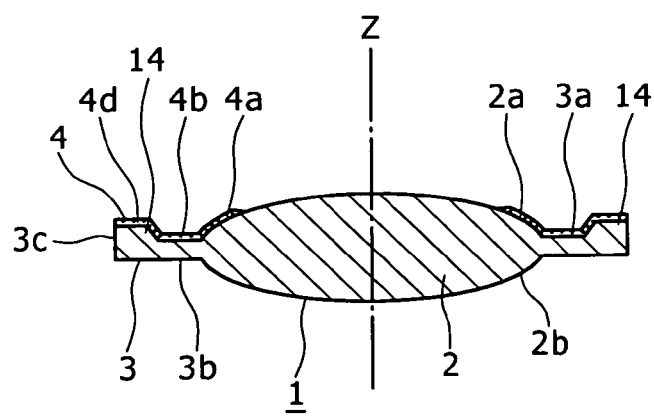

LENS BARREL AND IMAGE PICKUP UNIT

CROSS REFERENCES TO RELATED APPLICATIONS

The present invention contains subject matter related to Japanese Patent Application JP 2008-012575 filed in the Japan Patent Office on Jan. 23, 2008, the entire contents of which being incorporated herein by reference.

BACKGROUND OF THE INVENTION

1. Field of the Invention

The present invention relates to a technical field of a lens barrel and an image pickup unit, and particularly to a technical field in which miniaturization and the like are achieved by forming a print pattern that has a light shielding function and which is to adjust an interval between lenses in a direction of an optical axis.

2. Description of the Invention

Various image pickup devices such as video cameras, still cameras and the like have a lens barrel in which a plurality of lenses are arranged in a state of being separated from each other in a direction of an optical axis.

In addition, an image pickup unit referred to as a camera module having a plurality of lenses, an image pickup element and the like arranged therein has recently been incorporated into various electronic devices, for example portable telephones, personal computers, PDAs (Personal Digital Assistants) and the like so that the electronic devices such as portable telephones, personal computers, PDAs and the like are used also as an image pickup device.

When various image pickup devices as described above pick up an image of a subject, rays of light that have entered a lens pass through various paths within a lens barrel or an image pickup unit, and then form an image on an image pickup surface of an image pickup element. At this time, when undesired reflected light, scattered light, stray light or the like occurs at a lens, the image pickup element or the like, a phenomenon such as a so-called ghost, which is a light ring or spot or the like, a so-called flare, which is partial whitening of the image, or the like may occur in the image, which lowers image quality significantly.

An image pickup device in related art is disclosed, for example, which blocks detrimental rays of light from the outside of the effective diameter of a lens by a light shielding sheet disposed between the lens and another lens, for example, to prevent the lowering of image quality due to the occurrence of such a ghost or flare.

SUMMARY OF THE INVENTION

In the case of using a light shielding sheet to prevent the lowering of image quality as in the image pickup device described in Japanese Patent Laid-Open No. 2005-309289, when the positional accuracy of the light shielding sheet with respect to the lens is low, a degradation in shading characteristics or an eclipse occurs. When a large displacement of the light shielding sheet occurs, an inconvenience may occur in that the light shielding sheet comes into contact with a zoom mechanism, a focus mechanism or the like incorporated in the lens barrel or the image pickup unit at a time of zoom driving or at a time of focus driving, and an abnormal sound is caused by the contact.

Thus, in order to prevent the lowering of image quality by using a light shielding sheet, a high precision is required of the arrangement position of the light shielding sheet with respect to the lens.

However, because the light shielding sheet is disposed at a position different from that of the lens on which rays of light are made incident, there is a high degree of difficulty in ensuring a high positional accuracy of the light shielding sheet with respect to the lens.

As there has been a high demand for smaller size and higher performance as in the case of recent image pickup devices, in particular, it is often difficult to incorporate a light shielding sheet into an optical system of which a high positional accuracy is required with precision in a manufacturing process.

On the other hand, as there has been a high demand for higher performance as described above, it is necessary not only to provide shielding from undesired light such as stray light and the like but also to improve positional accuracy between lenses.

There is a technique of disposing a spacer for adjusting the positions of such lenses between lens holders retaining the lenses in order to improve the positional accuracy between the lenses. However, using the spacer presents a problem of correspondingly increasing the number of parts and manufacturing cost.

In addition, using a light shielding sheet for shielding from undesired light in addition to the spacer for improving the positional accuracy between the lenses further increases the number of parts, and necessitates positional adjustment between the lenses in consideration of the thickness of the light shielding sheet, thus causing other problems of a surge in manufacturing cost and a hindrance to miniaturization due to complication of design and the increase in the number of parts.

It is accordingly desirable to overcome the above-described problems, and achieve miniaturization and a reduction in the number of parts in addition to an excellent light shielding property and an improvement in positional accuracy between lenses.

According to an embodiment of the present invention, there is provided a lens barrel including: a plurality of lenses arranged in a state of being separated from each other in a direction of an optical axis; and a lens retaining body for retaining the lenses; wherein a print pattern that has a light shielding function and is partly in contact with the lens retaining body to adjust an interval between the lenses in the direction of the optical axis is formed on at least one of the plurality of lenses.

According to another embodiment of the present invention, there is provided an image pickup unit disposed inside an image pickup device, the image pickup unit including: a plurality of lenses arranged in a state of being separated from each other in a direction of an optical axis; a lens retaining body for retaining the lenses; and an image pickup element for converting image pickup light captured as an image pickup signal via the plurality of lenses into an image signal; wherein a print pattern that has a light shielding function and is partly in contact with the lens retaining body to adjust an interval between the lenses in the direction of the optical axis is formed on at least one of the plurality of lenses.

Thus, the lens barrel and the image pickup unit exert the light shielding function and the function of adjusting the interval between the lenses by the print pattern formed on the lens.

In the lens barrel and the image pickup unit described above, it is desirable that the lens on which the print pattern is formed be formed by a lens section transmitting rays of light and a flange section jutting out from a peripheral section of the lens section. When the lens is formed by the lens section and the flange section, a stable lens retention state can be ensured by retaining the flange section by the lens retaining body.

In addition, in the lens barrel and the image pickup unit described above, it is desirable that the print pattern be formed on a part of the lens section, and that the print pattern be formed on at least a part of the flange section. A light shielding property is improved by forming the print pattern on the lens section.

Further, in the lens barrel and the image pickup unit described above, it is desirable that an ultraviolet curing ink be used as a material for the print pattern. Generally, printing onto an antireflection coating provided on the surface of the lens is made possible by using the ultraviolet curing ink as material for the print pattern.

Further, in the lens barrel and the image pickup unit described above, the print pattern can be used as an adhesive for bonding together the lens retaining body and the lens on which the print pattern is formed. By forming the print pattern and bonding together the lens and the lens retaining body by an ink having an adhesive strength, the work of bonding the lens to the lens retaining body can be performed simultaneously with the work of printing the print pattern.

In the lens barrel and the image pickup unit described above, it is desirable that to enhance the adhesive strength of the lens to the lens retaining body, a storing concave part for storing the print pattern used as the adhesive be formed in a part adjacent to a periphery of the lens in the lens retaining body.

In addition, in the lens barrel and the image pickup unit described above, a plurality of lens holders are used as the lens retaining body, a first lens holder and a second lens holder retain the lens on which the print pattern is formed by sandwiching the lens from the direction of the optical axis, a predetermined lens is retained by the second lens holder, and a space for tolerating a tilt of the second lens holder with respect to the direction of the optical axis is formed between the first lens holder and the second lens holder. Thereby the tilt of the second lens holder with respect to the first lens holder is tolerated, and the tilt of the predetermined lens with respect to the optical axis can be adjusted.

Further, the tilt of the second lens holder with respect to the first lens holder is set by a thickness of the print pattern formed on the lens, and a tilt of the predetermined lens retained by the second lens holder with respect to the optical axis is adjusted. It is thus unnecessary to perform the tilt adjustment and the formation of the print pattern as separate pieces of work.

According to a first embodiment of the present invention, there is provided a lens barrel including: a plurality of lenses arranged in a state of being separated from each other in a direction of an optical axis; and a lens retaining body for retaining the lenses; wherein a print pattern that has a light shielding function and is partly in contact with the lens retaining body to adjust an interval between the lenses in the direction of the optical axis is formed on at least one of the plurality of lenses.

Thus, because the print pattern formed on the lens can exert a light shielding function and adjust the interval between the lenses, it is possible to achieve miniaturization and a reduction in the number of parts in addition to an excellent light shielding property and an improvement in positional accuracy between the lenses.

According to a second embodiment of the present invention, the lens on which the print pattern is formed is formed by a lens section transmitting rays of light and a flange section jutting out from a peripheral section of the lens section. It is thus possible to ensure excellent retainability of the lens by the lens retaining body, and improve the positional accuracy of the lens.

According to a third embodiment of the present invention, the print pattern is formed on a part of the lens section, and the print pattern is formed on at least a part of the flange section. It is thus possible to improve image quality through an improvement in a light shielding property.

According to a fourth embodiment of the present invention, the print pattern is formed by an ultraviolet curing ink. Because the ink is cured by being irradiated with ultraviolet rays simultaneously with being applied to a surface of the lens at a time of printing onto the lens, the ink can be printed onto an antireflection coating provided to the surface of the lens.

According to a fifth embodiment of the present invention, the print pattern is used as an adhesive for bonding together the lens retaining body and the lens on which the print pattern is formed. It is therefore possible to perform the work of bonding the lens to the lens retaining body simultaneously with the work of printing the print pattern onto the lens, and thus improve workability in the work of assembling the lens barrel.

According to a sixth embodiment of the present invention, a storing concave part for storing the print pattern used as the adhesive is formed in a part adjacent to a periphery of the lens in the lens retaining body. It is thus possible to enhance adhesive strength of the lens to the lens retaining body.

According to a seventh embodiment of the present invention, a plurality of lens holders are used as the lens retaining body, a first lens holder and a second lens holder retain the lens on which the print pattern is formed by sandwiching the lens from the direction of the optical axis, a predetermined lens is retained by the second lens holder, and a space for tolerating a tilt of the second lens holder with respect to the direction of the optical axis is formed between the first lens holder and the second lens holder. Thereby the tilt of the second lens holder with respect to the first lens holder is tolerated, and the tilt of the predetermined lens with respect to the optical axis can be adjusted.

According to an eighth embodiment of the present invention, the tilt of the second lens holder with respect to the first lens holder is set by a thickness of the print pattern formed on the lens, and a tilt of the predetermined lens retained by the second lens holder with respect to the optical axis is adjusted. It is therefore unnecessary to perform the tilt adjustment and the formation of the print pattern as separate pieces of work, and thus workability in the work of assembling the lens barrel can be improved.

According to a ninth embodiment of the present invention, there is provided an image pickup unit disposed inside an image pickup device, the image pickup unit including: a plurality of lenses arranged in a state of being separated from each other in a direction of an optical axis; a lens retaining body for retaining the lenses; and an image pickup element for converting image pickup light captured as an image pickup signal via the plurality of lenses into an image signal; wherein a print pattern that has a light shielding function and is partly in contact with the lens retaining body to adjust an interval between the lenses in the direction of the optical axis is formed on at least one of the plurality of lenses.

Thus, because the print pattern formed on the lens can exert a light shielding function and adjust the interval between the lenses, it is possible to achieve miniaturization and a reduction in the number of parts in addition to an excellent light shielding property and an improvement in positional accuracy between the lenses.

According to a tenth embodiment of the present invention, the lens on which the print pattern is formed is formed by a lens section transmitting rays of light and a flange section jutting out from a peripheral section of the lens section. It is thus possible to ensure excellent retainability of the lens by the lens retaining body, and improve the positional accuracy of the lens.

According to an eleventh embodiment of the present invention, the print pattern is formed on a part of the lens section, and the print pattern is formed on at least a part of the flange section. It is thus possible to improve image quality through an improvement in a light shielding property.

According to a twelfth embodiment of the present invention, the print pattern is formed by an ultraviolet curing ink. Because the ink is cured by being irradiated with ultraviolet rays simultaneously with being applied to a surface of the lens at a time of printing onto the lens, the ink can be printed onto an antireflection coating provided to the surface of the lens.

According to a thirteenth embodiment of the present invention, the print pattern is used as an adhesive for bonding together the lens retaining body and the lens on which the print pattern is formed. It is therefore possible to perform the work of bonding the lens to the lens retaining body simultaneously with the work of printing the print pattern onto the lens, and thus improve workability in the work of assembling the image pickup unit.

According to a fourteenth embodiment of the present invention, a storing concave part for storing the print pattern used as the adhesive is formed in a part adjacent to a periphery of the lens in the lens retaining body. It is thus possible to enhance adhesive strength of the lens to the lens retaining body.

According to a fifteenth embodiment of the present invention, a plurality of lens holders are used as the lens retaining body, a first lens holder and a second lens holder retain the lens on which the print pattern is formed by sandwiching the lens from the direction of the optical axis, a predetermined lens is retained by the second lens holder, and a space for tolerating a tilt of the second lens holder with respect to the direction of the optical axis is formed between the first lens holder and the second lens holder. Thereby the tilt of the second lens holder with respect to the first lens holder is tolerated, and the tilt of the predetermined lens with respect to the optical axis can be adjusted.

According to a sixteenth embodiment of the present invention, the tilt of the second lens holder with respect to the first lens holder is set by a thickness of the print pattern formed on the lens, and a tilt of the predetermined lens retained by the second lens holder with respect to the optical axis is adjusted. It is therefore unnecessary to perform the tilt adjustment and the formation of the print pattern as separate pieces of work, and thus workability in the work of assembling the image pickup unit can be improved.

BRIEF DESCRIPTION OF THE DRAWINGS

FIG. 19 shows a concrete example of lens tilt adjustment in conjunction with FIG. 20, and is a conceptual diagram showing XYZ directions and the XYZ coordinates of projecting section print parts;

DETAILED DESCRIPTION OF THE PREFERRED EMBODIMENTS

Preferred embodiments of a lens barrel and an image pickup unit according to the present invention will hereinafter be described with reference to the accompanying drawings.

Figure 1:
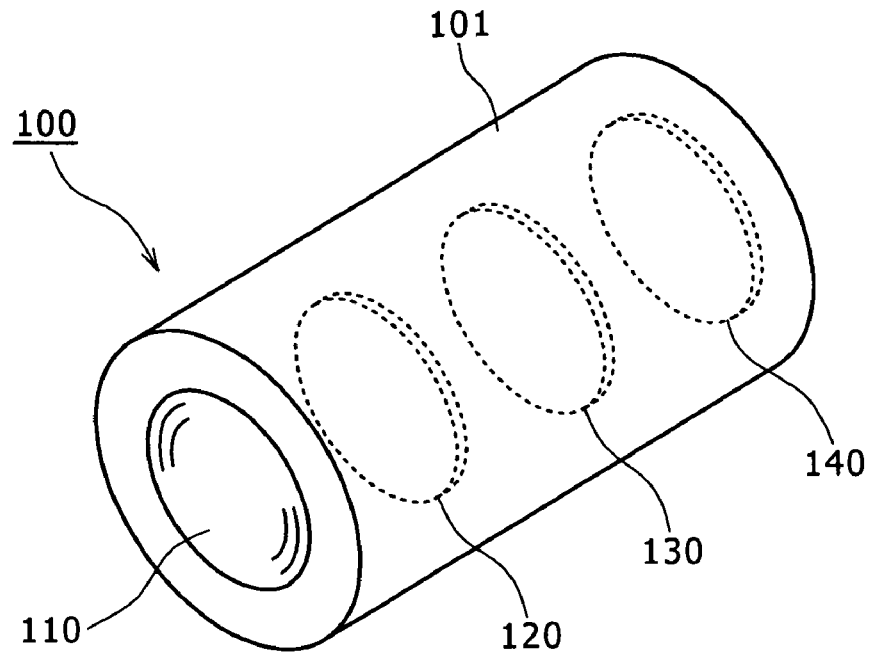
FIG. 1 illustrates the best mode of the present invention together with FIGS. 2 to 21, and is a schematic perspective view of a lens barrel.

A lens barrel 100 is for example provided in various image pickup devices such as a video camera, a still camera and the like. As shown in FIG. 1, the lens barrel 100 has a lens retaining cylinder 101 formed so as to be long in a direction of an optical axis and a plurality of lenses 110, 120, 130, ... arranged so as to be separated from each other in the direction of the optical axis within the lens retaining cylinder 101. The lenses 110, 120, 130, ... are retained by a lens holder to be described later, and are each fixed or movable in the direction of the optical axis.

Incidentally, in the lens barrel 100, the lens holder may be formed by a member separate from the lens retaining cylinder 101. Alternatively, the lens retaining cylinder 101 may be formed by a plurality of members, and the members may be respectively used as lens holders retaining the lenses 110, 120, 130, .... Thus, the lens holder or the lens retaining cylinder 101 functions as a lens retaining body that retains the lenses.

A zoom driving mechanism and a focus driving mechanism, not shown in the figure, for moving a predetermined lens in the direction of the optical axis are disposed within the lens retaining cylinder 101.

An image pickup element not shown in the figure is disposed at a rear end part of the lens retaining cylinder 101. For example, a CCD (Charge Coupled Device) or CMOS (Complementary Metal-Oxide Semiconductor) is used as the image pickup element.

An image pickup unit 200 is for example incorporated into various electronic devices such as a portable telephone, a personal computer, a PDA (Personal Digital Assistant) and the like, and is referred to as a camera module.

Figure 2:
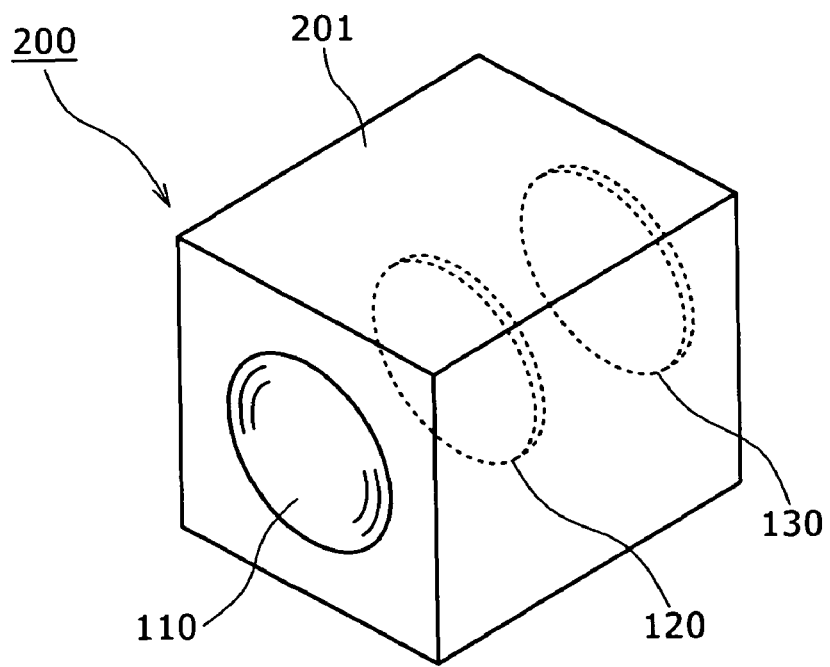
FIG. 2 is a schematic perspective view of an image pickup unit.

As shown in FIG. 2, the image pickup unit 200 has an external casing 201 and a plurality of lenses 110, 120, 130, . . . arranged so as to be separated from each other in a direction of an optical axis within the external casing 201. The lenses 110, 120, 130, . . . are retained by a lens holder to be described later, and are each fixed or movable in the direction of the optical axis.

Incidentally, in the image pickup unit 200, the lens holder may be formed by a member separate from the external casing 201. Alternatively, the external casing 201 may be formed by a plurality of members, and the members may be respectively used as lens holders retaining the lenses 110, 120, 130, . . . . Thus, the lens holder or the external casing 201 functions as a lens retaining body that retains the lenses.

As in the lens barrel 100, a zoom driving mechanism and a focus driving mechanism, not shown in the figure, for moving a predetermined lens in the direction of the optical axis may also be disposed within the external casing 201.

An image pickup element not shown in the figure is disposed at a rear end part of the external casing 201. For example, a CCD or CMOS is used as the image pickup element.

A print pattern is formed on at least one of the lenses 110, 120, 130, . . . arranged in the lens barrel 100 or the image pickup unit 200 formed as described above. The lens on which the print pattern is formed will be described below as a lens 1.

Figure 3:
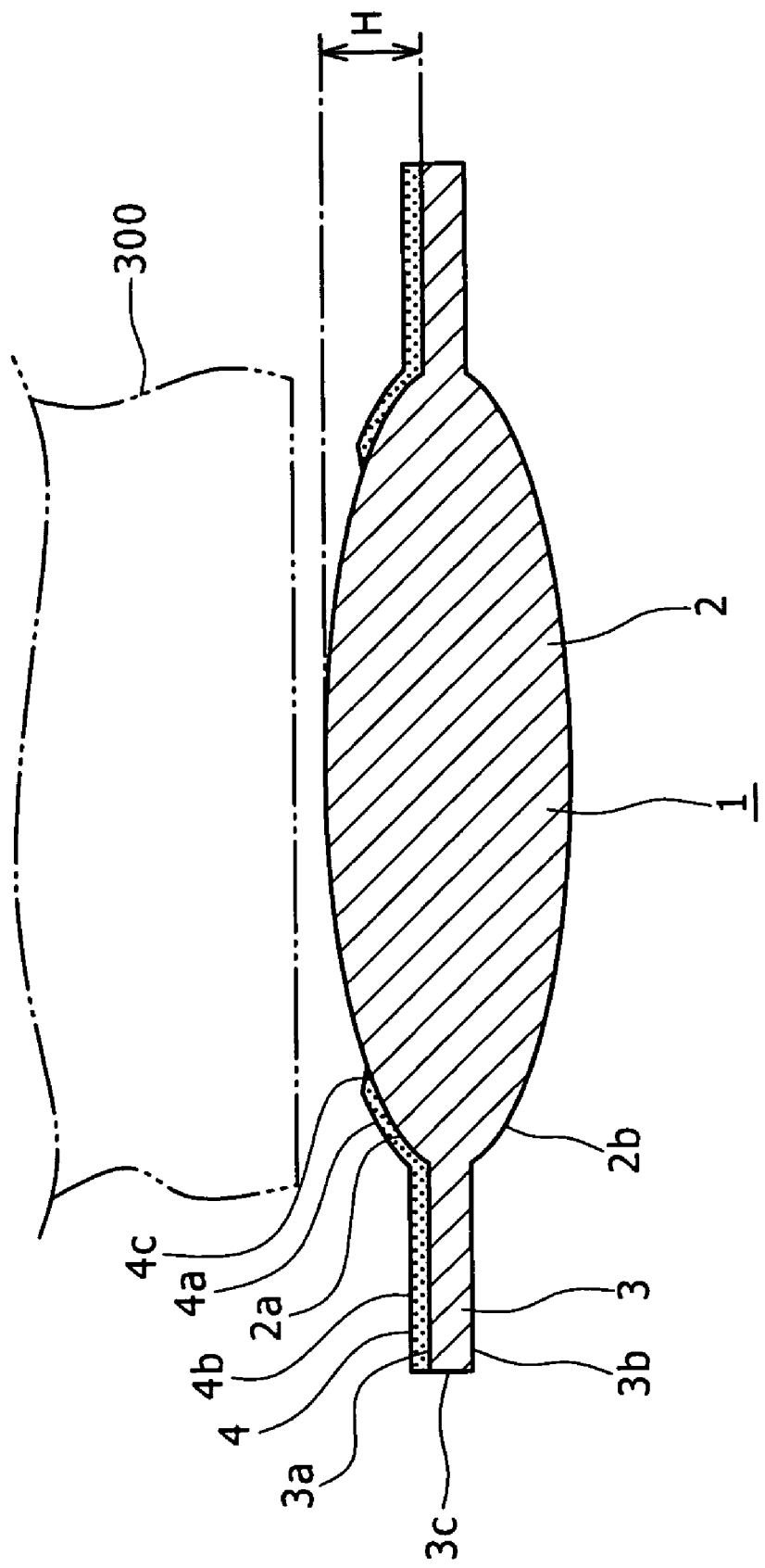
FIG. 3 is an enlarged sectional view of a lens to be printed together with a head section.

As shown in FIG. 3, the lens 1 is made by integrally forming a lens section 2 transmitting rays of light taken in as image pickup light and a flange section 3 jutting out from the peripheral section of the lens section 2 by a transparent glass or resin, for example. The lens 1 is for example formed as a convex lens whose lens section 2 projects from the flange section 3 in the direction of the optical axis.

An antireflection coating is provided to at least a part of a surface of the lens 1, for example the entire surface of the lens section 2. The antireflection coating is for example formed by magnesium fluoride in the case of a single layer, and is formed by alternately laminating a high refractive index material such as titanium dioxide or the like and a low refractive index material such as silicon dioxide or the like in the case of multiple layers.

A print pattern 4 is formed on a part of the lens 1 which pattern functions as a light shielding section for preventing incidence of undesired reflected light, scattered light, stray light and the like and as a spacer section to be described later. The print pattern 4 is formed on the peripheral section in one surface 2*a* of the lens section 2 and one surface 3*a* of the flange section 3 continuous with the peripheral section.

Incidentally, it is generally difficult to apply an ink without a quick drying property to the surface provided with the antireflection coating. Specifically, a solvent-based ink (including pigment-based inks and dye-based inks) whose viscosity is 3 to 4 cps (centipoises) or less at room temperature is repelled by the antireflection coating, and is thus difficult to print. In addition, a solvent-based ink or a thermosetting type ink is splashed onto the periphery when droplets of the ink impact on the surface of the lens, and is thus not usable to print the lens where print position accuracy is required.

Accordingly, an ultraviolet curing black ink, for example, is used as a material for the print pattern 4 on the lens 1. An ultraviolet curing ink is cured by being irradiated with ultraviolet rays simultaneously with being applied onto the surface when printed onto the lens 1, and can thus be printed onto the above-described antireflection coating.

As for coating with the ultraviolet curing ink, compatibility (adhesion) between the ultraviolet curing ink and the antireflection coating is important. Specifically, when printing is performed onto an antireflection coating of low wettability, which wettability indicates an interfacial phenomenon between the surface of a solid and a fluid in contact with the surface of the solid, the printing may be peeled under high-temperature conditions. It is thus desirable to select a type of ultraviolet curing ink in consideration of the state (wettability) of the surface of the antireflection coating when printing the antireflection coating.

Incidentally, for enhanced adhesion of the print pattern 4 to the surface of the lens 1, for example ground treatment such as plasma treatment or the like can be performed on the surface of the lens 1 which surface is to be printed.

In addition, for enhanced adhesion of the print pattern 4 to the surface of the lens 1, for example, antireflection coating may be performed on parts other than the surface of the lens 1 which surface is to be printed, with the antireflection coating not being performed on the surface of the lens 1 which surface is to be printed. Forming the print pattern 4 on the part not provided with the antireflection coating can increase the adhesion strength of the printed surface. In this case, it is not necessary to form the print pattern 4 on the antireflection coating, and therefore an ink other than the ultraviolet curing ink can be used for the print pattern 4.

Figure 4:
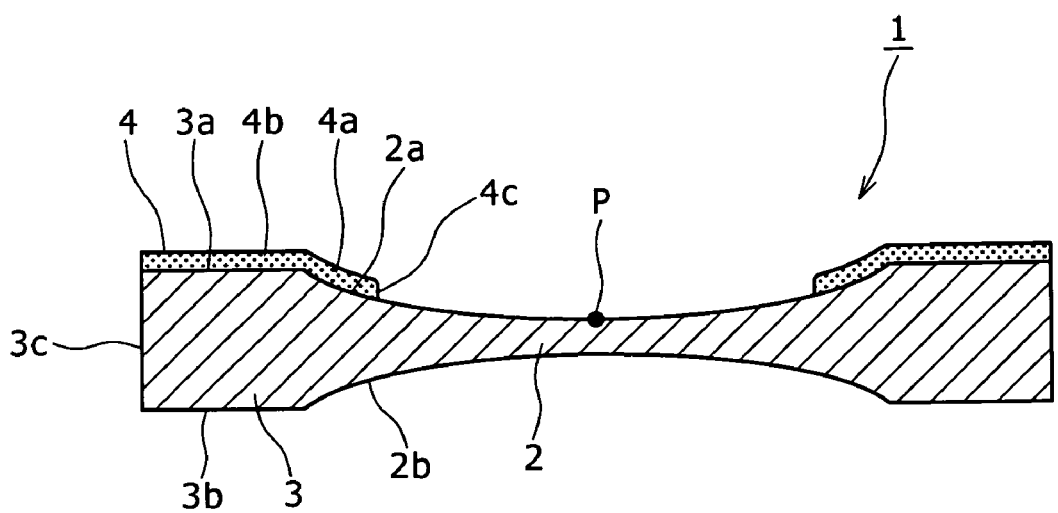
FIG. 4 is an enlarged sectional view of a concave lens on which a print pattern is formed.

As described above, the print pattern 4 is formed on the surface of the lens 1 to function as a light shielding section, so that the light shielding section can be formed in a state of adhering to the surface of the lens 1 (see FIG. 3 and FIG. 4). Thus, no space is formed between the print pattern 4 and the surface of the lens 1, and therefore a light shielding property can be improved.

Incidentally, while a case of forming the print pattern 4 on the peripheral section in one surface 2*a* of the lens section 2 and one surface 3*a* of the flange section 3 continuous with the peripheral section has been shown as an example in the above description, the position of formation of the print pattern 4 is not limited to the peripheral section in one surface 2*a* of the lens section 2 and one surface 3*a* of the flange section 3 continuous with the peripheral section. For improvement of the light shielding property or the like, the print pattern 4 can be formed additionally on a peripheral section in another surface 2*b* of the lens section 2, another surface 3*b* of the flange section 3, and a peripheral surface 3*c* of the flange section 3, for example.

The print pattern 4 is formed on the lens 1 by using an ink jet printer, for example. The head section 300 (see FIG. 3) of the ink jet printer has for example a length (height) of about 7 cm, a width (breadth) of about 7 cm, and a thickness. (depth) of about 2 cm. On the other hand, the lens 1 has an outside diameter (diameter) of about 10 mm, for example.

When the print pattern 4 is formed on the lens 1 by the head section 300, an ink jetted out from the head section 300 desirably flies within a distance of 4 mm so that stable print position accuracy is ensured. Hence, when the lens 1 is a convex lens as shown in FIG. 3, a distance H between the vertex of the lens section 2 and the flange section 3 is desirably 3 mm or less in order to prevent contact between the head section 300 and the lens section 2. Incidentally, when the lens 1 is a concave lens as shown in FIG. 4, it is desirable that a distance between the head section 300 and the deepest part P of the lens section (concave section) 2 be within 4 mm, and that a distance between the head section 300 and the flange section 3 be 1 mm or more.

The lens 1 has the print pattern 4 function as a light shielding section for preventing incidence of undesired reflected light, scattered light, stray light and the like, and also has a part of the print pattern 4 function as a spacer section for adjusting an interval to another lens.

The thickness of the print pattern 4 as the spacer section can be adjusted by an amount of coating of the ultraviolet curing ink. In order to use the print pattern 4 as light shielding section-cum-spacer section, the OD (Optical Density) value of the print pattern 4 needs to be three or more. In order for the print pattern 4 to have an OD value of three or more, the print pattern 4 needs to have a thickness of 20 µm or more when the ultraviolet curing ink is used.

Description will next be made of a procedure for the formation of the print pattern 4 on the lens 1 and preceding and succeeding work involved in the formation of the print pattern 4.

When printing is performed on the surface of the lens, depending on a lens retaining structure, there are a case where the printing needs to be performed with the lens not retained by the lens retaining structure and a case where the printing can be performed with the lens retained by the lens retaining structure.

Figure 5:
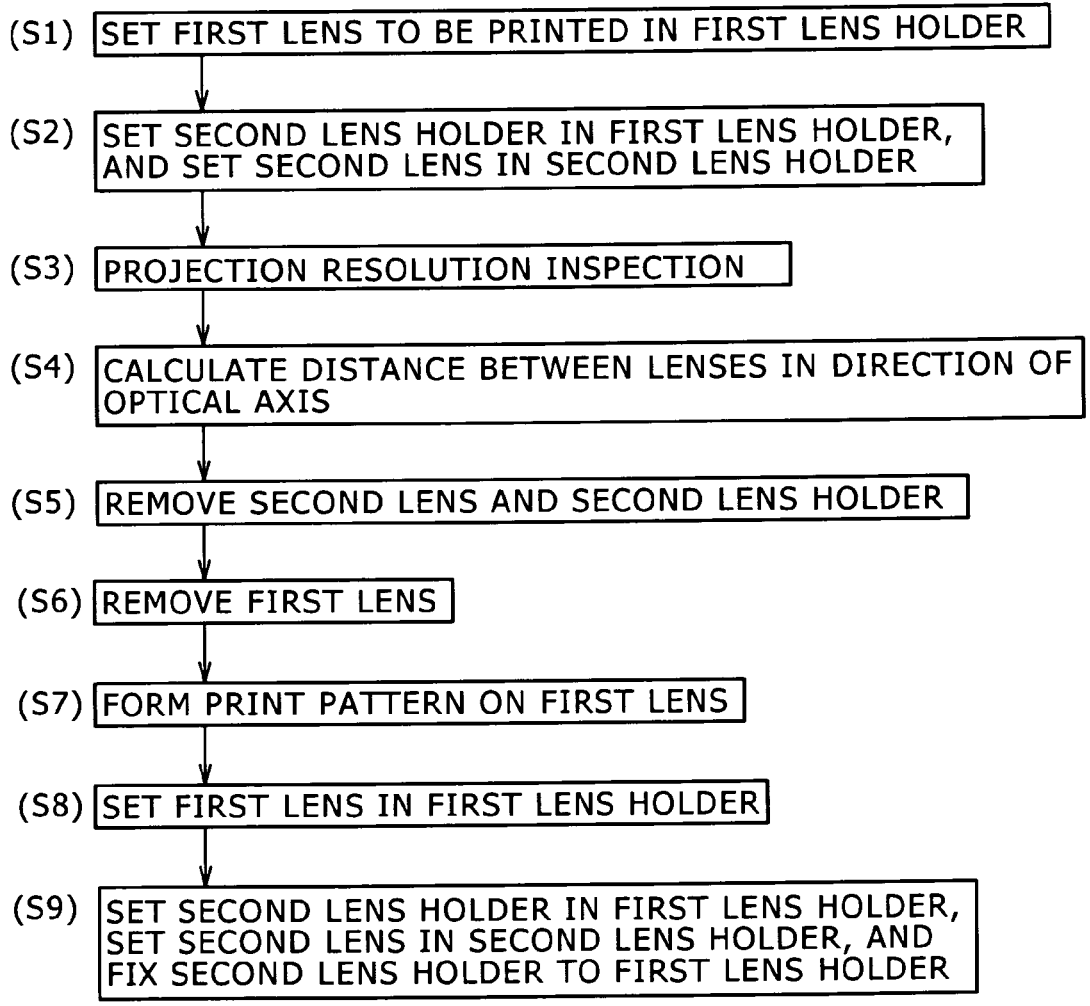
FIG. 5 is a flowchart representing a case where printing is performed with the lens not retained by a lens retaining body.

The case where the printing is performed with the lens not retained by the lens retaining structure will first be described with reference to a flowchart of FIG. 5.

Figure 6:
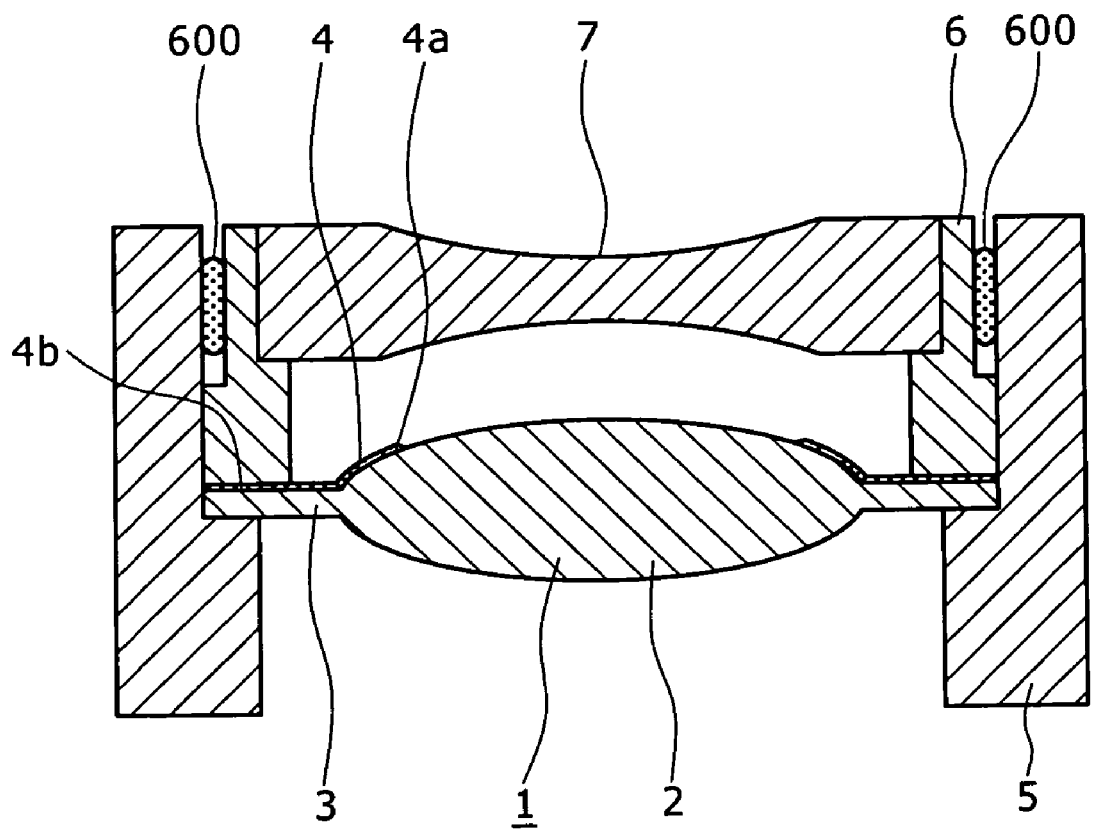
FIG. 6 is a sectional view of a state in which two lenses are retained by a lens holder, in connection with FIG. 5.

The case where the printing needs to be performed with the lens not retained by the lens retaining structure is for example a case where as shown in FIG. 6, a first lens holder 5 projects from the lens 1 in a direction of an optical axis with the lens 1 to be printed retained in a state of being interposed between the first lens holder 5 and a second lens holder 6 and with another lens 7 retained by the second lens holder 6. In such a case, the head section 300 interferes with the projecting part of the first lens holder 5 with the lens 1 retained by the first lens holder 5. Therefore the printing needs to be performed with the lens 1 not retained by the first lens holder 5.

(S1) In forming the print pattern 4, the lens 1 is first set in the first lens holder 5. The lens 1 is not fixed to the first lens holder 5.

(S2) The second lens holder 6 to which the lens 7 is fixed in advance is set in the first lens holder 5. The second lens holder 6 is not fixed to the first lens holder 5.

(S3) Projection resolution inspection is performed. The positions of the lens 1 and the lens 7 in the direction of the optical axis are detected by the projection resolution inspection.

(S4) A distance between the lens 1 and the lens 7 in the direction of the optical axis is calculated on the basis of the positions of the lens 1 and the lens 7 in the direction of the optical axis which positions are detected by the projection resolution inspection. A difference between the calculated distance and a distance between the lens 1 and the lens 7 in the direction of the optical axis which distance is necessary according to design is calculated.

(S5) The second lens holder 6 to which the lens 7 is fixed is removed from the first lens holder 5.

(S6) The lens 1 is removed from the first lens holder 5.

(S7) The print pattern 4 is formed on the lens 1.

(S8) The lens 1 on which the print pattern 4 is formed is set in the first lens holder 5.

(S9) The second lens holder 6 to which the lens 7 is fixed is set in the first lens holder 5, and the second lens holder 6 is fixed to the first lens holder 5, whereby the work is completed (see FIG. 6). The second lens holder 6 is fixed to the first lens holder 5 by using an adhesive 600, 600, . . . , for example. In addition, the lens 1 is fixed to the first lens holder 5 by adhesion, for example.

Concrete description will be made below of the work of forming the print pattern 4 in the above step (S7).

Figure 7:
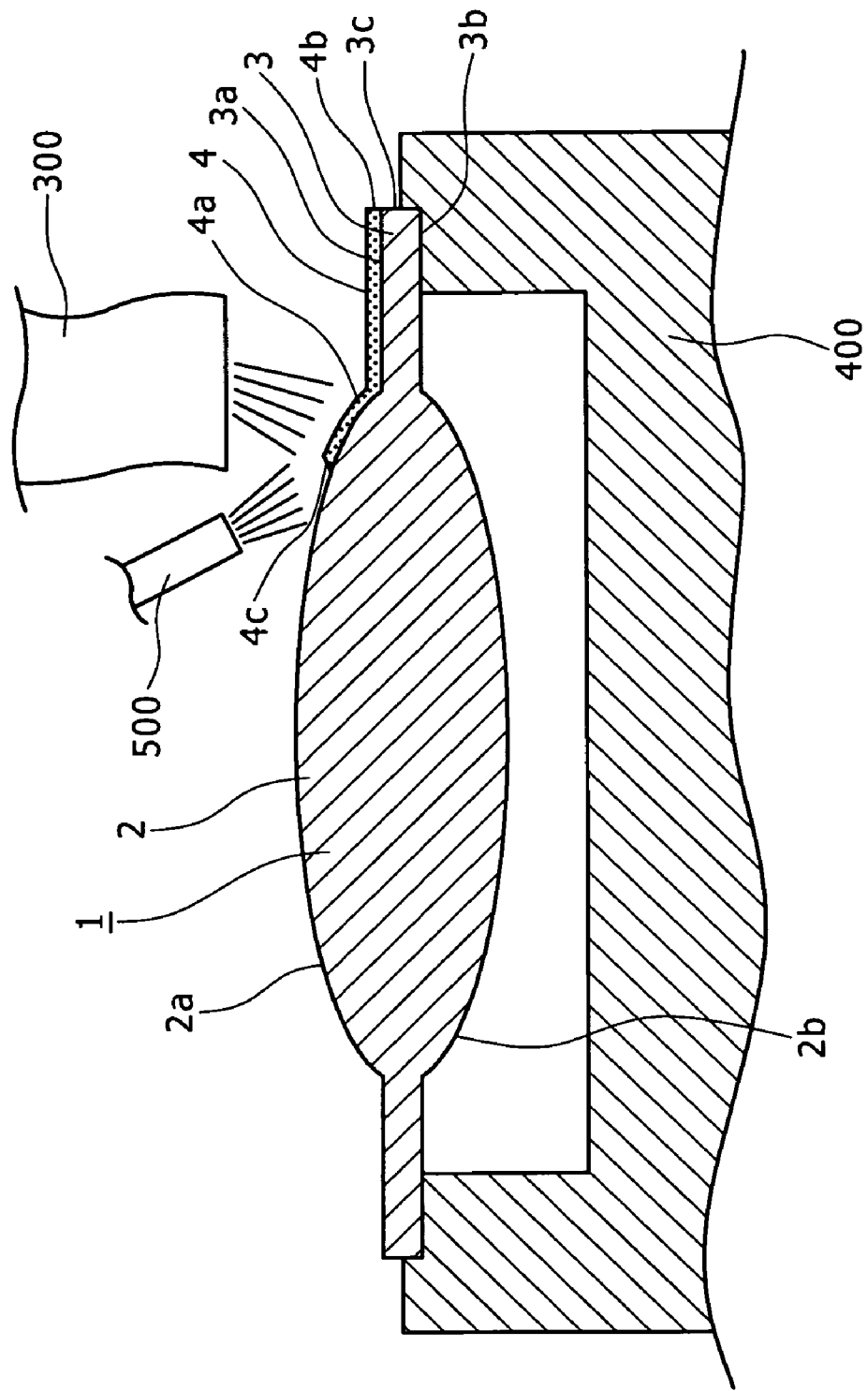
FIG. 7 is an enlarged sectional view of a state in which a print pattern is formed on a lens.

As shown in FIG. 7, the work of forming the print pattern 4 is performed by mounting and retaining the lens 1 on a retaining support 400, injecting for example an ultraviolet curing ink from the head section 300 and thereby applying the ultraviolet curing ink to the surface of the lens 1, and simultaneously curing the applied ink by irradiating the ink with ultraviolet rays from an ultraviolet irradiator 500.

At this time, first, the entire print part, or a first print part 4a on the peripheral part of the lens section 2 and a second print part 4b on the flange section 3 are formed to a thickness of 20 µm or more. By forming the entire print part to a thickness of 20 µm or more, it is possible to secure an OD value of three or more, and secure an excellent light shielding property of the print pattern 4.

However, the first print part 4a having a thickness of more than 50 µm as a result of the printing causes reflection of light rays at an edge part 4c, so that undesired reflected light may enter the lens section 2. Thus, the thickness of the first print part 4a needs to be 50 µm or less, which prevents the reflection of light rays at the edge part 4c. In addition, because it is desirable to secure an OD value of four or more to ensure shielding from undesired light, the thickness of the print pattern 4 is preferably 30 µm, at which an OD value of four or more can be secured.

Accordingly, it is more desirable to first form the first print part 4a and the second print part 4b as the entire print part to a thickness of 30 µm to 50 µm.

After the entire print part is formed to at least a thickness of 20 µm or more, or preferably to a thickness of 30 µm to 50 µm, as described above, finish coat printing is next performed on only the second print part 4b as required.

The finish coat printing is work necessary to adjust an interval between the lens 1 and the lens 7 in the direction of the optical axis with the lens 1 and the lens 7 retained by the first lens holder 5 and the second lens holder 6 as shown in FIG. 6. Thus, the second print part 4b of the print pattern 4 also functions as a spacer section for adjusting the interval between the lens 1 and the lens 7. Specifically, as shown in FIG. 6, the second print part 4b and the flange section 3 are retained in a state of being interposed between the first lens holder 5 and the second lens holder 6. A distance between the first lens holder 5 and the second lens holder 6 in the direction of the optical axis is varied according to the thickness of the second print part 4b. A distance between the lens 1 and the lens 7 in the direction of the optical axis is also varied according to the distance between the first lens holder 5 and the second lens holder 6 in the direction of the optical axis. The second print part 4b thus functions as a spacer section for adjusting the interval between the lens 1 and the lens 7 in the direction of the optical axis according to the thickness of the printing.

The thickness of the second print part 4b is calculated on the basis of the difference between the distance between the lens 1 and the lens 7 in the direction of the optical axis which distance is calculated in step (S4) on the basis of the projection resolution inspection of step (S3) and a distance between the lens 1 and the lens 7 in the direction of the optical axis which distance is necessary according to design.

Figure 8:
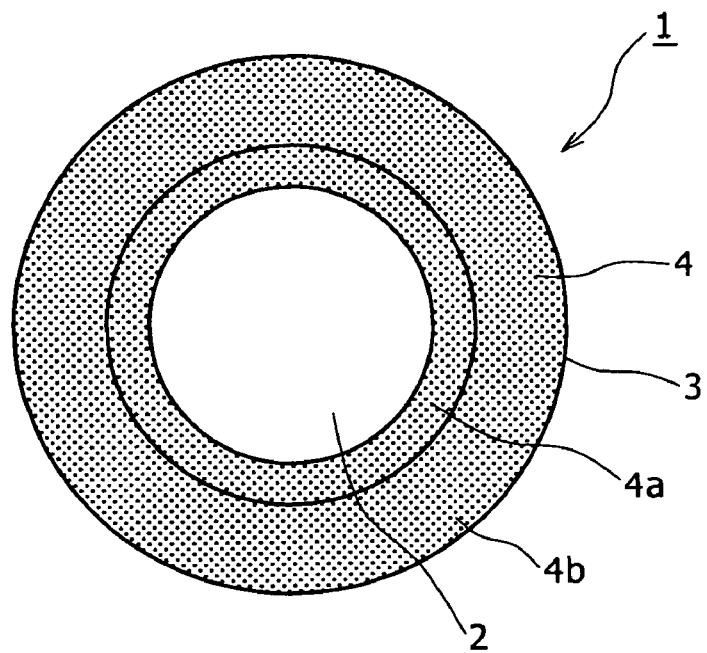
FIG. 8 is an enlarged plan view of the lens on which the inner circumference of the print pattern is formed in a circular shape.
Figure 9:
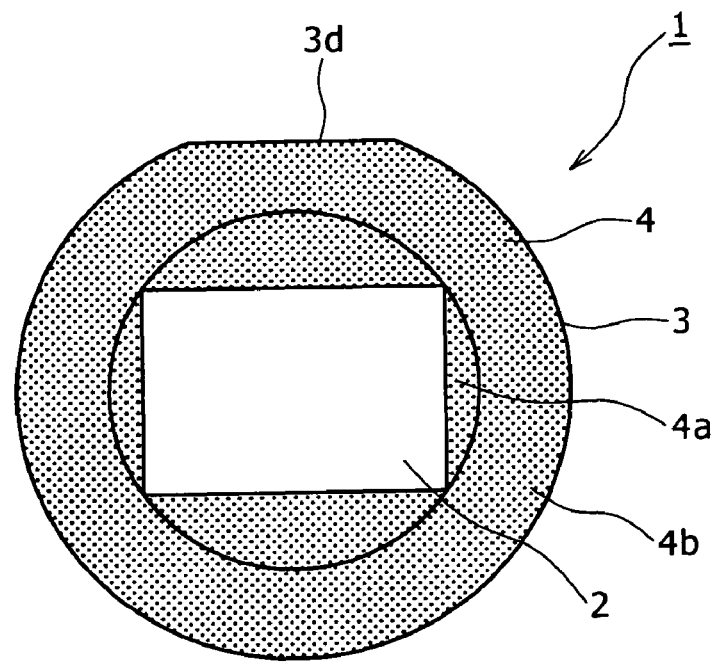
FIG. 9 is an enlarged plan view of the lens on which the inner circumference of the print pattern is formed in a rectangular shape.

Incidentally, because the lens 1 is a rotationally symmetric body, when the inner circumference of the first print part 4*a* is of a circular shape as shown in FIG. 8, positional displacement of the first print part 4*a* in a circumferential direction does not occur in the state of the lens 1 being retained by the first lens holder 5 and the second lens holder 6. However, when the inner circumference of the first print part 4*a* is not of the circular shape as shown in FIG. 9, positional displacement of the first print part 4*a* in the circumferential direction may occur in the state of the lens 1 being retained by the first lens holder 5 and the second lens holder 6. Incidentally, the inner circumference of the first print part 4*a* is not of the circular shape in for example a case where a region for incidence of light rays on the lens section 2 is set so as to correspond to the shape of the image pickup surface of the image pickup element.

In order to prevent positional displacement of the first print part 4*a* in the circumferential direction as described above, a cutaway part 3*d* corresponding to the shape of the inner circumference of the first print part 4*a* is desirably formed in the flange section 3, as shown in FIG. 9, for example.

Figure 10:
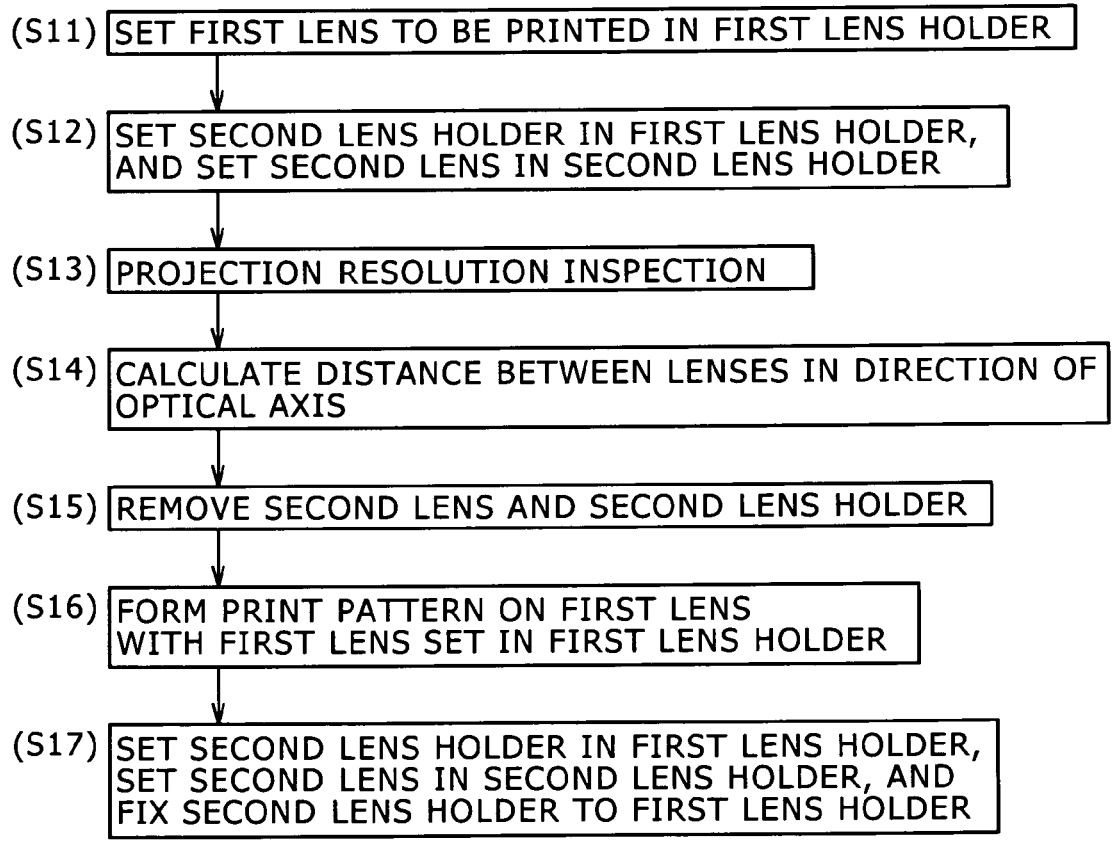
FIG. 10 is a flowchart representing a case where printing is performed with the lens retained by a lens retaining body.

The case where the printing is performed with the lens retained by the lens retaining structure will next be described with reference to a flowchart of FIG. 10.

Figure 11:
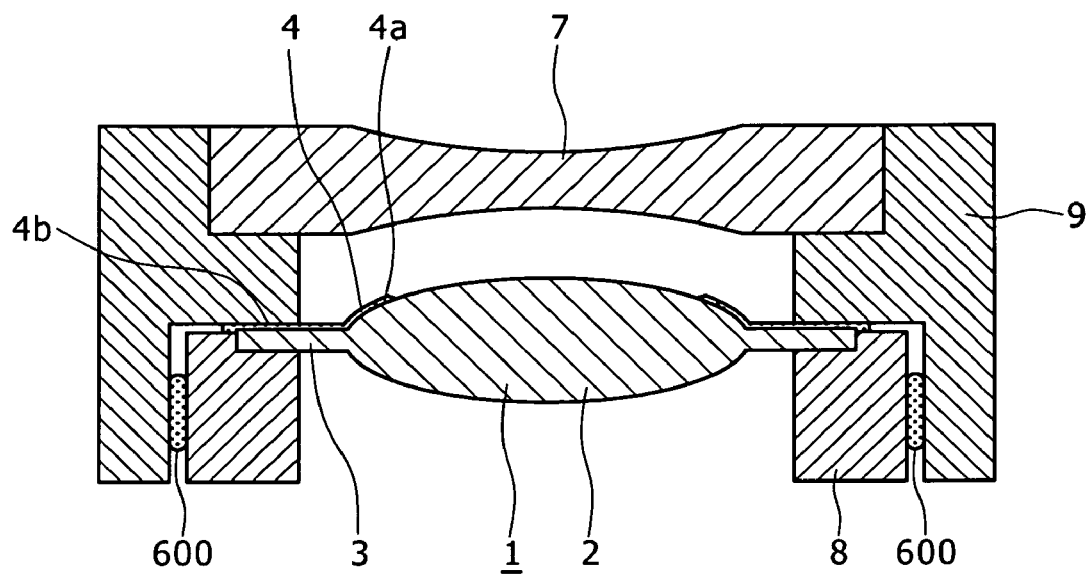
FIG. 11 is a sectional view of a state in which two lenses are retained by a lens holder, in connection with FIG. 10.

The case where the printing can be performed with the lens retained by the lens retaining structure is for example a case where as shown in FIG. 11, a first lens holder 8 does not project from the lens 1 in the direction of the optical axis with the lens 1 to be printed retained by the first lens holder 8. In such a case, the head section 300 does not interfere with the first lens holder 8 with the lens 1 retained by the first lens holder 8, so that the printing can be performed with the lens 1 retained by the first lens holder 8.

(S11) In forming the print pattern 4, the lens 1 is first set in the first lens holder 8. The lens 1 is not fixed to the first lens holder 8.

(S12) A second lens holder 9 to which the lens 7 is fixed in advance is set in the first lens holder 8. The second lens holder 9 is not fixed to the first lens holder 8.

(S13) Projection resolution inspection is performed. The positions of the lens 1 and the lens 7 in the direction of the optical axis are detected by the projection resolution inspection.

(S14) A distance between the lens 1 and the lens 7 in the direction of the optical axis is calculated on the basis of the positions of the lens 1 and the lens 7 in the direction of the optical axis which positions are detected by the projection resolution inspection. A difference between the calculated distance and a distance between the lens 1 and the lens 7 in the direction of the optical axis which distance is necessary according to design is calculated.

(S15) The second lens holder 9 to which the lens 7 is fixed is removed from the first lens holder 8.

(S16) The print pattern 4 is formed on the lens 1 with the lens 1 set in the first lens holder 8.

(S17) The second lens holder 9 to which the lens 7 is fixed is set in the first lens holder 8, and the second lens holder 9 is fixed to the first lens holder 8, whereby the work is completed (see FIG. 11). The second lens holder 9 is fixed to the first lens holder 8 by using an adhesive 600, 600, . . . , for example. In addition, the lens 1 is fixed to the first lens holder 8 by adhesion, for example.

Concrete description will be made below of the work of forming the print pattern 4 in the above step (S16).

As described above, the work of forming the print pattern 4 is performed by injecting for example an ultraviolet curing ink from the head section 300 and thereby applying the ultraviolet curing ink to the surface of the lens 1 with the lens 1 retained by the first lens holder 8, and simultaneously curing the applied ink by irradiating the ink with ultraviolet rays from an ultraviolet irradiator 500.

At this time, first, the entire print part, or a first print part 4*a* on the peripheral part of the lens section 2 and a second print part 4*b* on the flange section 3 are formed to a thickness of 20 µm or more. By forming the entire print part to a thickness of 20 µm or more, it is possible to secure an OD value of three or more, and secure an excellent light shielding property of the print pattern 4.

However, the first print part 4*a* having a thickness of more than 50 µm as a result of the printing causes reflection of light rays at an edge part 4*c*, so that undesired reflected light may enter the lens section 2. Thus, the thickness of the first print part 4*a* needs to be 50 µm or less, which prevents the reflection of light rays at the edge part 4*c*. In addition, because it is desirable to secure an OD value of four or more to ensure shielding from undesired light, the thickness of the print pattern 4 is preferably 30 µm, at which an OD value of four or more can be secured.

Accordingly, it is more desirable to first form the first print part 4*a* and the second print part 4*b* as the entire print part to a thickness of 30 µm to 50 µm.

After the entire print part is formed to at least a thickness of 20 µm or more, or preferably to a thickness of 30 µm to 50 µm, as described above, finish coat printing is next performed on only the second print part 4*b* as required.

The finish coat printing is work necessary to adjust an interval between the lens 1 and the lens 7 in the direction of the optical axis with the lens 1 and the lens 7 retained by the first lens holder 8 and the second lens holder 9 as shown in FIG. 11. Thus, the second print part 4*b* of the print pattern 4 also functions as a spacer section for adjusting the interval between the lens 1 and the lens 7. Specifically, as shown in FIG. 11, the second print part 4*b* and the flange section 3 are retained in a state of being interposed between the first lens holder 8 and the second lens holder 9. A distance between the first lens holder 8 and the second lens holder 9 in the direction of the optical axis is varied according to the thickness of the second print part 4*b*. A distance between the lens 1 and the lens 7 in the direction of the optical axis is also varied according to the distance between the first lens holder 8 and the second lens holder 9 in the direction of the optical axis. The second print part 4*b* thus functions as a spacer section for adjusting the interval between the lens 1 and the lens 7 in the direction of the optical axis according to the thickness of the printing.

The thickness of the second print part 4*b* is calculated on the basis of the difference between the distance between the lens 1 and the lens 7 in the direction of the optical axis which distance is calculated in step (S14) on the basis of the projection resolution inspection of step (S13) and a distance between the lens 1 and the lens 7 in the direction of the optical axis which distance is necessary according to design.

Incidentally, in the case of performing the printing with the lens 1 retained by the first lens holder 8 as described above, unlike the case of performing the printing with the lens 1 not retained by the first lens holder 8, the printing is performed with an arbitrary position of the first lens holder 8 as a reference, and thus positional displacement of the first print part 4*a* in the circumferential direction does not occur even when the inner circumference of the first print part 4*a* is of a circular shape as shown in FIG. 8. Thus, the inner circumference of the first print part 4a can be formed into an arbitrary shape without a cutaway part 3d as shown in FIG. 9 being formed in the lens 1.

Figure 12:
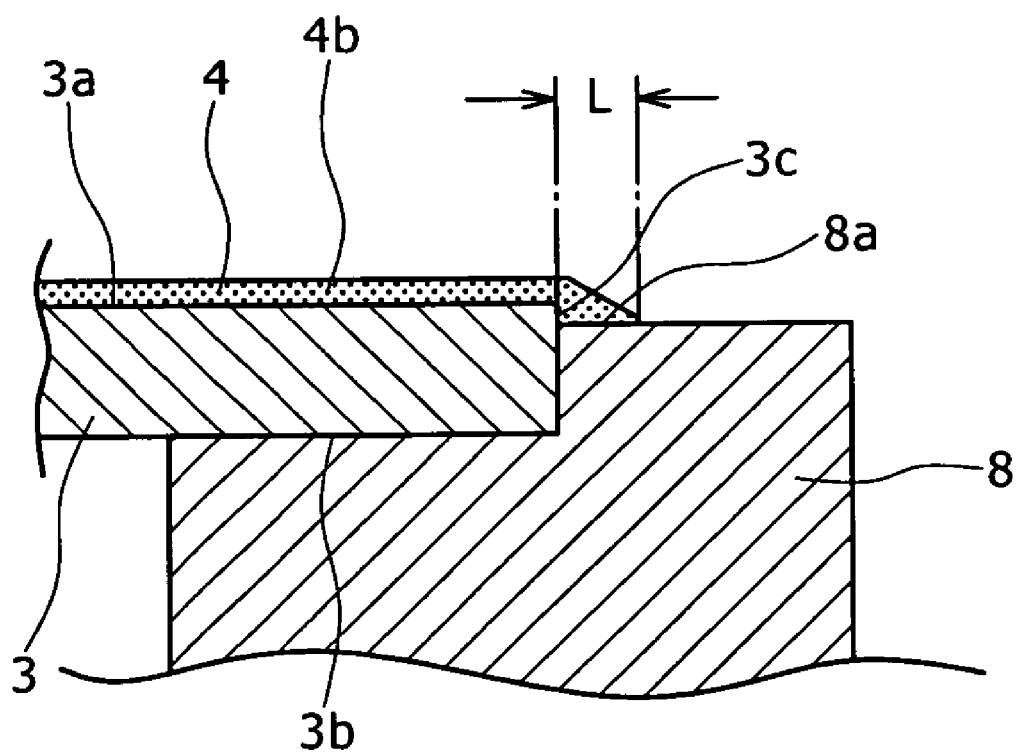
FIG. 12 is an enlarged sectional view of an example in which the print pattern is used as an adhesive.

In addition, in the case of performing the printing with the lens 1 retained by the first lens holder 8, when the ink as a printing material has an adhesive strength, the lens 1 can be fixed to the first lens holder 8 by being bonded to the first lens holder 8 simultaneously with the formation of the print pattern 4 on the lens 1 (see FIG. 12). The lens 1 is fixed to the first lens holder 8 by being bonded to the first lens holder 8 at the time of the printing as a result of the ink being injected from the head section 300 such that the ink is also applied from the outer circumference surface 3c of the flange section 3 to a part 8a of the first lens holder 8 situated on the outside of the outer circumference surface 3c of the flange section 3 at the time of forming the print pattern 4 in step (S16). An area L where the ink is applied to the part 8a needs to be for example about 2 mm from the outer circumference surface 3c of the flange section 3 to the outside to secure a good adhesive strength.

By thus performing the work of bonding the lens 1 to the first lens holder 8 simultaneously with the work of printing the print pattern 4 onto the lens 1, it is possible to improve workability in the work of assembling the lens barrel 100 and the image pickup unit 200.

In addition, a need for a process of bonding the lens 1 to the first lens holder 8 as a separate process is eliminated, so that a process of assembling the lens barrel 100 and the image pickup unit 200 can be simplified.

Figure 13:
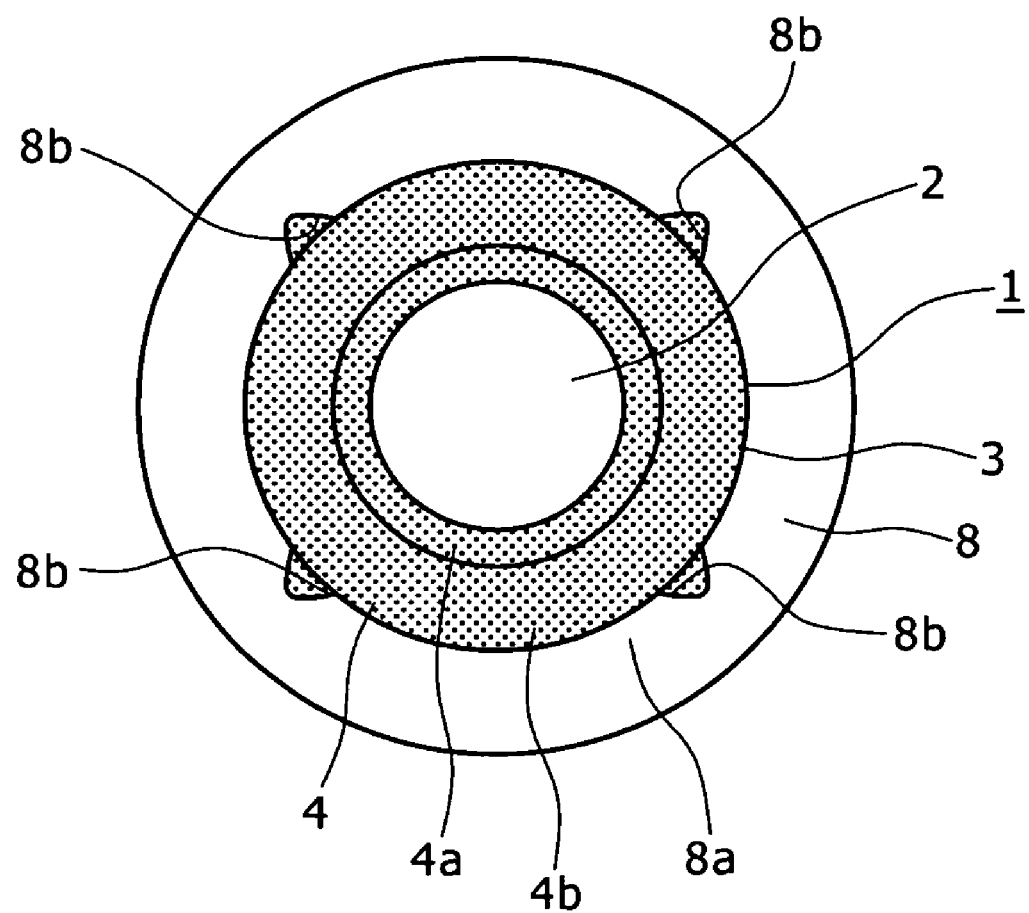
FIG. 13 is an enlarged plan view of an example in which storing concave parts for storing the adhesive are formed in a lens holder.

When the lens 1 is fixed to the first lens holder 8 by bonding simultaneously with the formation of the print pattern 4 on the lens 1, storing concave parts 8b, 8b, . . . for storing the ink in the part 8a of the first lens holder 8 may be formed as shown in FIG. 13 to improve the adhesive strength. The storing concave parts 8b may be formed so as to be separated from each other in the circumferential direction as shown in FIG. 13, or may be formed so as to be an annular ring on the entire part outside the peripheral surface 3c of the flange section 3.

The above description has illustrated a case of adjusting the interval between the lens 1 and the lens 7 in the direction of the optical axis by the thickness of the print pattern 4. However, in addition to the interval adjustment, a tilt of the lens 7 with respect to the optical axis can be adjusted by the thickness of the print pattern 4.

Figure 14:
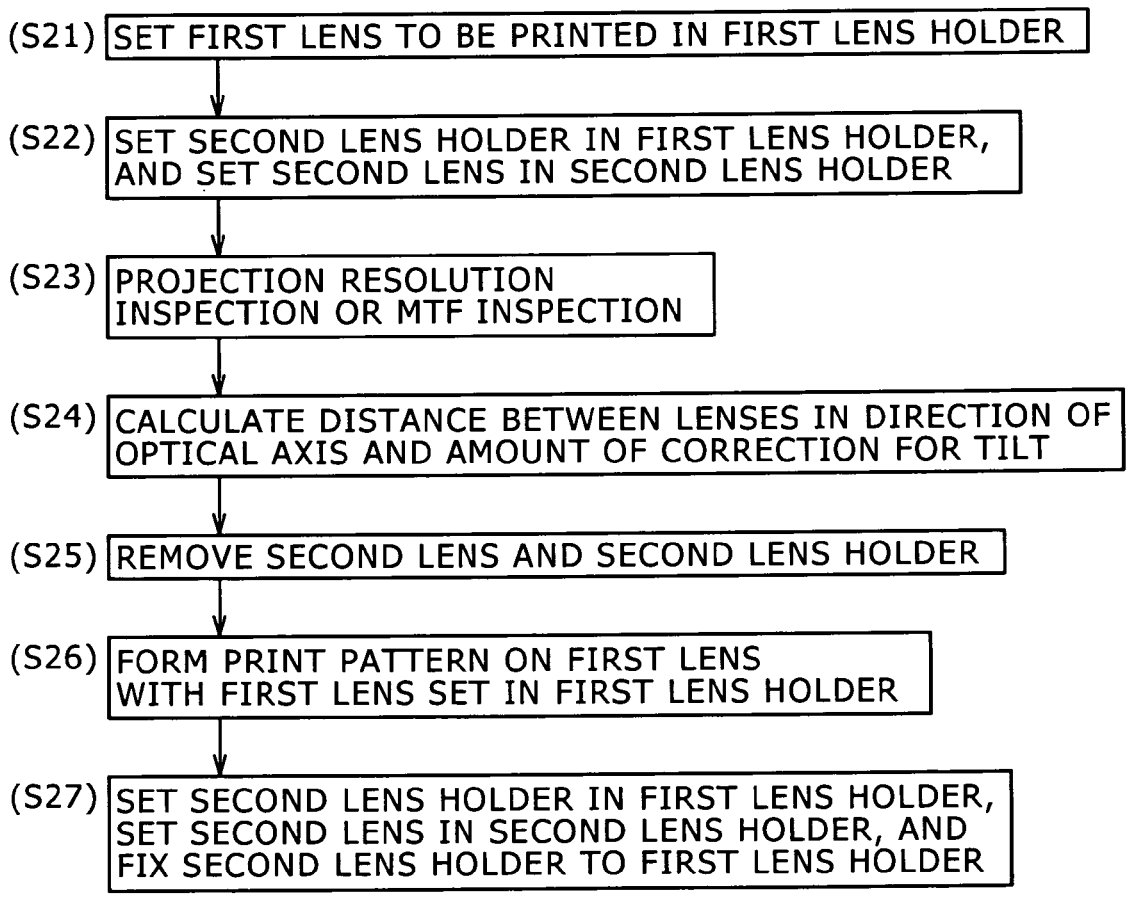
FIG. 14 is a flowchart representing a case where lens tilt adjustment is made at a time of printing.

The case of adjusting the tilt of the lens 7 with respect to the optical axis at the time of forming the print pattern 4 will be described below with reference to a flowchart of FIG. 14.

Figure 15:
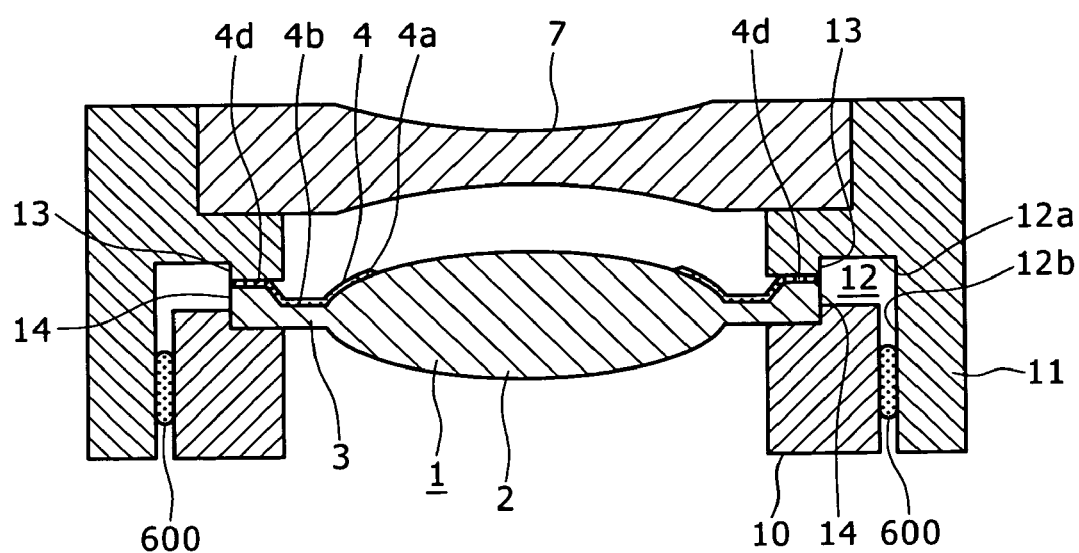
FIG. 15 is a sectional view of a state in which two lenses are retained by a lens holder, in connection with FIG. 14.

At the time of adjusting the tilt, for example, as shown in FIG. 15, a space 12 for tolerating the tilt of a second lens holder 11 with respect to a first lens holder 10 needs to be provided between the first lens holder 10 and the second lens holder 11 in a state in which the lens 1 to be printed is retained by the first lens holder 10 and the lens 7 is retained by the second lens holder 11. The space 12 has a gap 12a in the direction of the optical axis and a gap 12b in a direction orthogonal to the optical axis. Because the space 12 has the gap 12a and the gap 12b, the tilt of the second lens holder 11 retaining the lens 7 with respect to the first lens holder 10 is tolerated.

Figure 16:
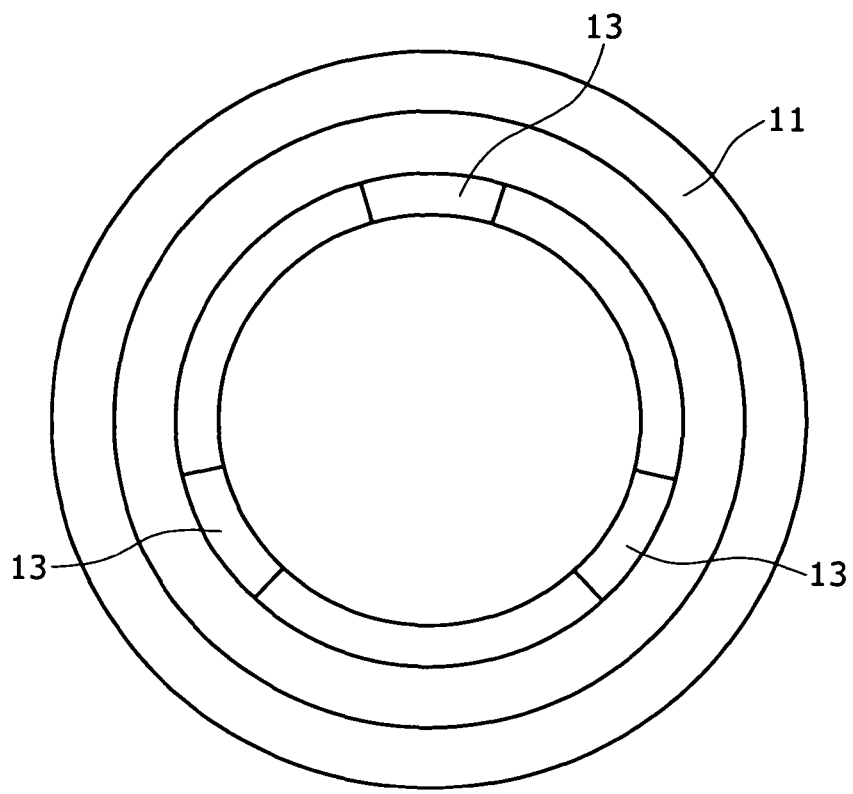
FIG. 16 is an enlarged bottom view of the lens holder provided with a butting section.

A surface of the second lens holder 11 which surface is butted against the flange section 3 is provided with a plurality of butting sections 13, 13, and 13 separated from each other at equal intervals in a circumferential direction and projected downward from other parts (see FIG. 16).

Figure 17:
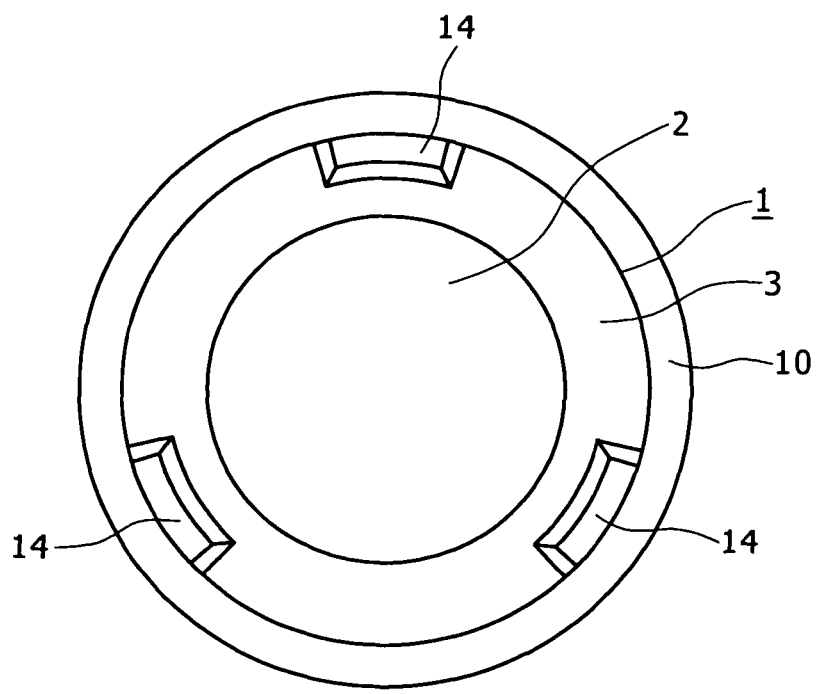
FIG. 17 is an enlarged plan view of a state in which the lens provided with a contact projecting section is retained by the lens holder.

A surface of the flange section 3 of the lens 1 which surface faces the second lens holder 11 is provided with a plurality of contact projecting sections 14, 14, and 14 separated from each other at equal intervals in the circumferential direction and projected upward from other parts (see FIG. 17). The contact projecting sections 14, 14, and 14 of the lens 1 are respectively brought into contact with the butting sections 13, 13, and 13 of the second lens holder 11.

(S21) In forming the print pattern 4, the lens 1 is first set in the first lens holder 10. The lens 1 is not fixed to the first lens holder 10.

(S22) A second lens holder 11 to which the lens 7 is fixed in advance is set in the first lens holder 10. The second lens holder 11 is not fixed to the first lens holder 10.

(S23) Projection resolution inspection or MTF (spatial frequency: modulation transfer function) inspection is performed. The positions of the lens 1 and the lens 7 in the direction of the optical axis are detected by the projection resolution inspection or the MTF inspection.

(S24) A distance between the lens 1 and the lens 7 in the direction of the optical axis is calculated on the basis of the positions of the lens 1 and the lens 7 in the direction of the optical axis which positions are detected by the projection resolution inspection or the MTF inspection. A difference between the calculated distance and a distance between the lens 1 and the lens 7 in the direction of the optical axis which distance is necessary according to design is calculated. In addition, the tilt of the lens 7 with respect to the optical axis is calculated on the basis of the positions of the lens 1 and the lens 7 in the direction of the optical axis which positions are detected by the projection resolution inspection or the MTF inspection. An amount of correction for correcting the tilt is calculated.

(S25) The second lens holder 11 to which the lens 7 is fixed is removed from the first lens holder 10.

(S26) The print pattern 4 is formed on the lens 1 with the lens 1 set in the first lens holder 10. Incidentally, when the first lens holder 10 has a structure that projects from the lens 1 in the direction of the optical axis, the print pattern 4 cannot be formed with the lens 1 set in the first lens holder 10, and therefore the print pattern 4 is formed on the lens 1 after the lens 1 is removed from the first lens holder 10.

(S27) The second lens holder 11 to which the lens 7 is fixed is set in the first lens holder 10, and the second lens holder 11 is fixed to the first lens holder 10, whereby the work is completed (see FIG. 15). The second lens holder 11 is fixed to the first lens holder 10 by using an adhesive 600, 600, . . . , for example. In addition, the lens 1 is fixed to the first lens holder 10 by adhesion, for example. Incidentally, when the print pattern 4 is formed with the lens 1 removed from the first lens holder 10 in step (S26), the lens 1 is set in the first lens holder 10 prior to the setting of the second lens holder 11 in the first lens holder 10.

Concrete description will be made below of the work of forming the print pattern 4 in the above step (S26).

As described above, the work of forming the print pattern 4 is performed by injecting for example an ultraviolet curing ink from the head section 300 and thereby applying the ultraviolet curing ink to the surface of the lens 1 with the lens 1 retained by the first lens holder 10, and simultaneously curing the applied ink by irradiating the ink with ultraviolet rays from an ultraviolet irradiator 500. The ultraviolet curing ink is applied to the entire surface of the flange section 3 including the contact projecting sections 14, 14, and 14.

At this time, first, the entire print part, or a first print part 4a on the peripheral part of the lens section 2 and a second print part 4b on the flange section 3 are formed to a thickness of 20 μm or more. By forming the entire print part to a thickness of 20 μm or more, it is possible to secure an OD value of three or more, and secure an excellent light shielding property of the print pattern 4.

However, the first print part 4*a* having a thickness of more than 50 μm as a result of the printing causes reflection of light rays at an edge part 4*c*, so that undesired reflected light may enter the lens section 2. Thus, the thickness of the first print part 4*a* needs to be 50 μm or less, which prevents the reflection of light rays at the edge part 4*c*. In addition, because it is desirable to secure an OD value of four or more to ensure shielding from undesired light, the thickness of the print pattern 4 is preferably 30 μm, at which an OD value of four or more can be secured.

Accordingly, it is more desirable to first form the first print part 4*a* and the second print part 4*b* as the entire print part to a thickness of 30 μm to 50 μm.

Figure 18:
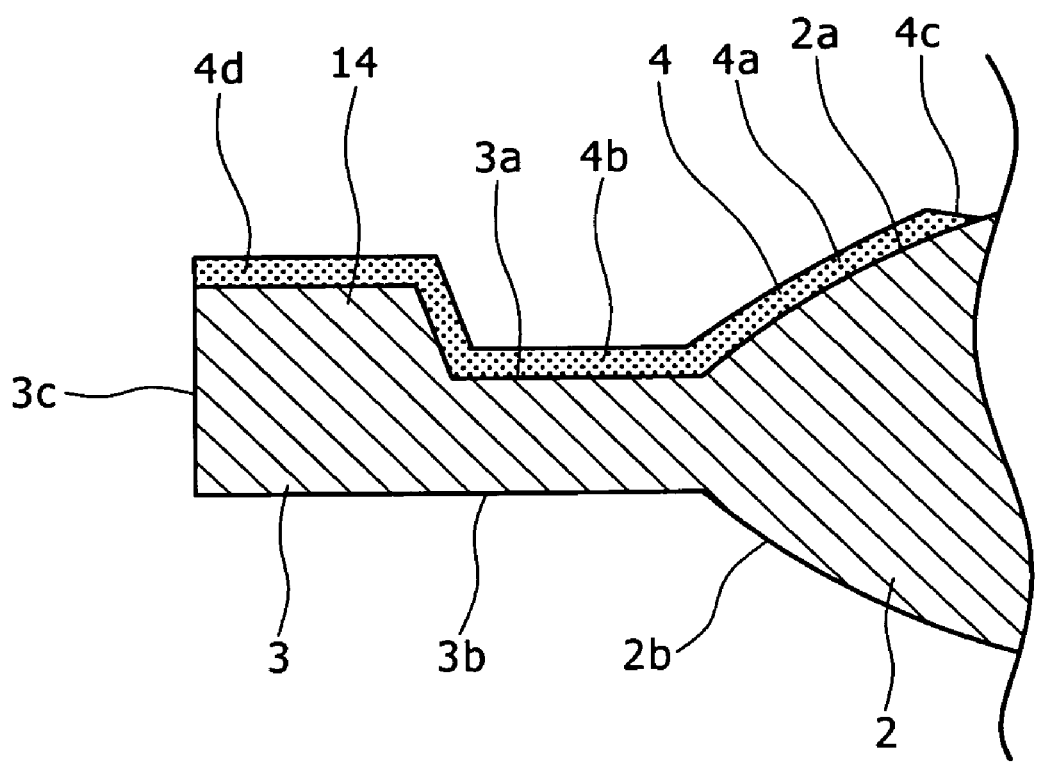
FIG. 18 is an enlarged sectional view of a state in which the print pattern is formed on the lens provided with the contact projecting section.

After the entire print part is formed to at least a thickness of 20 μm or more, or preferably to a thickness of 30 μm to 50 μm, as described above, finish coat printing is next performed on parts corresponding to the surfaces of the contact projecting sections 14, 14, and 14, that is, projecting section print parts 4*d*, 4*d*, and 4*d* (see FIG. 18) in the second print part 4*b* as required.

The finish coat printing is work necessary to adjust an interval between the lens 1 and the lens 7 in the direction of the optical axis and adjust the tilt of the lens 7 with respect to the optical axis with the lens 1 and the lens 7 retained by the first lens holder 10 and the second lens holder 11 as shown in FIG. 15. Thus, the projecting section print parts 4*d*, 4*d*, and 4*d* of the print pattern 4 also function as a spacer section for adjusting the interval between the lens 1 and the lens 7 and adjusting the tilt of the lens 7. Specifically, as shown in FIG. 15, the second print part 4*b* including the projecting section print parts 4*d*, 4*d*, and 4*d* and the flange section 3 are retained in a state of being interposed between the first lens holder 10 and the second lens holder 11. A distance between the first lens holder 10 and the second lens holder 11 in the direction of the optical axis is varied according to the thickness of the projecting section print parts 4*d*, 4*d*, and 4*d*. A distance between the lens 1 and the lens 7 in the direction of the optical axis is also varied according to the distance between the first lens holder 10 and the second lens holder 11 in the direction of the optical axis. In addition, the tilt of the second lens holder 11 and the lens 7 with respect to the optical axis is changed according to differences in thickness between the projecting section print parts 4*d*, 4*d*, and 4*d*. The projecting section print parts 4*d*, 4*d*, and 4*d* thus function as a spacer section for adjusting the interval between the lens 1 and the lens 7 in the direction of the optical axis and adjusting the tilt of the lens 7 with respect to the optical axis according to the thickness of the printing.

The thicknesses of the projecting section print parts 4*d*, 4*d*, and 4*d* are calculated on the basis of the difference between the distance between the lens 1 and the lens 7 in the direction of the optical axis which distance is calculated in step (S24) on the basis of the projection resolution inspection or the MTF inspection of step (S23) and a distance between the lens 1 and the lens 7 in the direction of the optical axis which distance is necessary according to design and an amount of correction for correcting the tilt.

A concrete example of adjusting the tilt of the lens 7 will be described below (see FIG. 19 and FIG. 20). The following description will be made supposing that the projecting section print parts 4*d*, 4*d*, and 4*d* of the lens 1 are respectively A, B, and C in the figures, that the center of the lens 1 is an origin O, that directions orthogonal to the optical axis and orthogonal to each other are an X-direction and a Y-direction, respectively, and that the direction of the optical axis is a Z-direction.

A case of tilting the lens 7 to the side of the projecting section print part A, that is, a case of changing the thicknesses of the projecting section print parts B and C with the projecting section print part A as a reference will be described as a concrete example.

Letting r be the radius of the lens 1, and letting α and β be the heights in the Z-direction of the projecting section print parts B and C, respectively, as shown in FIG. 19, the XYZ coordinates of the projecting section print parts A, B, and C are expressed as A(0, r, 0), B(√3r/2, −r/2, α), and C(−√3r/2, −r/2, β). When the XYZ coordinates of the projecting section print parts A, B, and C are used, a normal vector of a plane supported by three points of the projecting section print parts A, B, and C is expressed by the following Equation 1.

$$\vec{h} = (X_n, Y_n, Z_n)$$
$$= \vec{AC} \times \vec{AB}$$
$$= \left\{ \frac{3}{2}r(\beta - \alpha), \frac{\sqrt{3}}{2}r(\alpha + \beta), \frac{3\sqrt{3}}{2}r^2 \right\}$$

Equation 1

In addition, an angle of the normal vector expressed by Equation 1 with respect to XYZ planes, that is, an angle at which the second lens holder 11 and the lens 7 are tilted with respect to the optical axis when the thicknesses of the three points of the projecting section print parts A, B, and C are changed is expressed by the following Equation 2.

$$\tan\theta = \frac{Z_n}{\sqrt{(X_n^2 + Y_n^2)}}$$

Equation 2

Figure 20:
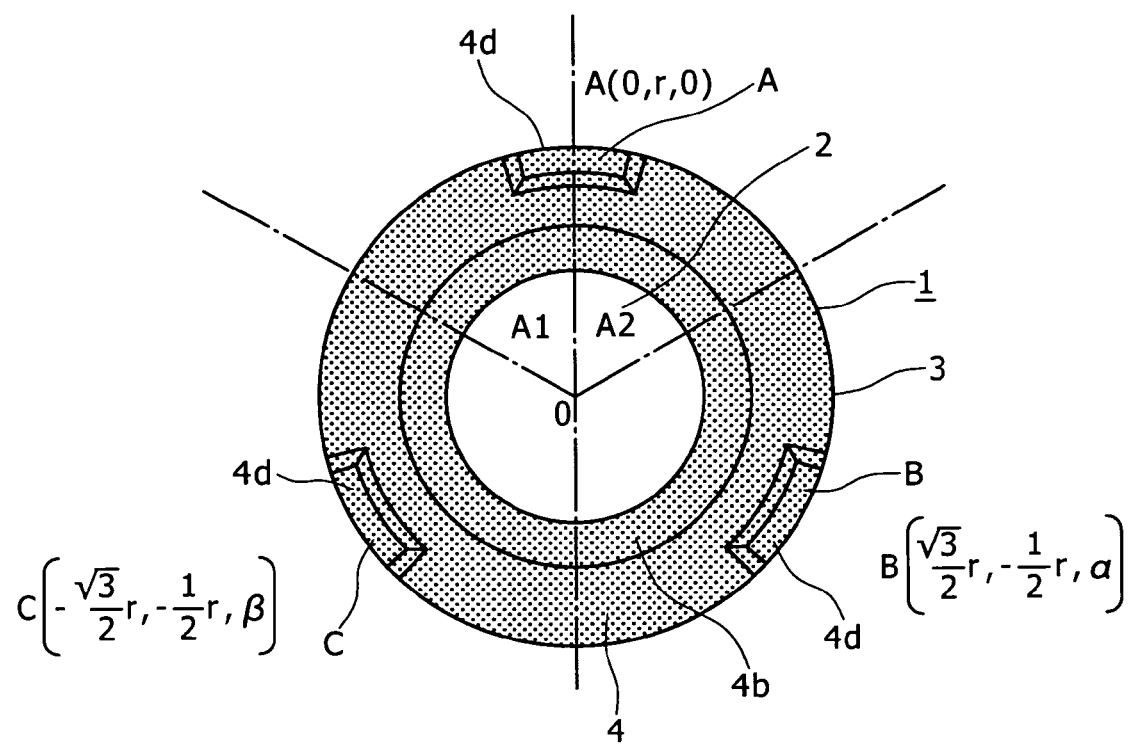
FIG. 20 is a conceptual diagram of assistance in explaining the direction of a lens tilt.

When a calculation is made using Equation 2 and for example supposing that a difference (β−α) between the projecting section print part B and the projecting section print part C in the direction of the optical axis is 10 μm and that the radius r of the lens 1 is 10 mm, the second lens holder 11 and the lens 7 are tilted by 0.107° in a direction A1 shown in FIG. 20 with respect to the optical axis of the lens 1. In addition, the position of the point of the normal vector of the plane supported by the three points of the projecting section print parts A, B, and C when orthogonal projection of the normal vector is made on the lens 1 can also be calculated on the basis of Equation 1.

Hence, using Equation 1 and Equation 2, as described above, the amount of correction for correcting the tilt of the lens 7 is calculated in advance on the basis of the projection resolution inspection or the MTF inspection, and the thicknesses of the projecting section print parts A, B, and C are determined on the basis of the calculated amount of correction, whereby the tilt of the lens 7 with respect to the optical axis can be adjusted.

Adjusting the tilt of the lens 7 retained in the second lens holder 11 with respect to the optical axis simultaneously with the formation of the print pattern 4 eliminates a need to perform the adjustment of the tilt and the formation of the print pattern 4 as separate pieces of work. It is therefore possible to improve workability in the work performed in the lens barrel 100 and the image pickup unit 200.

In addition, because the adjustment of the tilt of the lens 7 with respect to the optical axis and the above-described adjustment of the interval between the lens 1 and the lens 7 in the direction of the optical axis can be made simultaneously, it is possible to improve workability in the work necessary in the lens barrel 100 and the image pickup unit 200.

Figure 21:
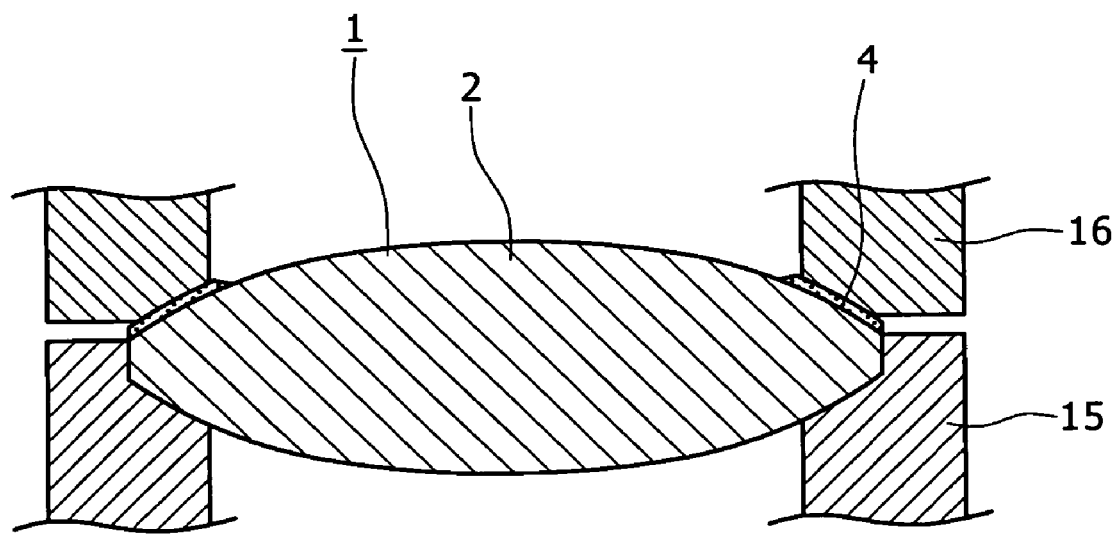
FIG. 21 is an enlarged sectional view of a state in which a lens without a flange section is retained by a lens holder.

Incidentally, while the above description has illustrated an example in which the lens 1 to be printed is formed by the lens section 2 and the flange section 3, the shape of the lens 1 is not limited to such a shape. For example, as shown in FIG. 21, the lens 1 may be formed by only the lens section 2, and the peripheral part of the lens section 2 may be retained by a first lens holder 15 and a second lens holder 16.

As described above, in the lens barrel 100 and the image pickup unit 200, the print pattern 4 that has a light shielding function and a part of which is to adjust an interval between lenses is formed on the lens 1. Thus, in addition to an excellent light shielding property and an improvement in positional accuracy between the lenses, it is possible to achieve miniaturization and a reduction in the number of parts.

In addition, when the lens 1 is formed by a lens section 2 transmitting rays of light and a flange section 3 jutting out from the peripheral section of the lens section 2, excellent retainability of the lens 1 by a lens retaining body can be ensured, and the positional accuracy of the lens 1 can be improved.

Further, by forming the print pattern 4 on a part (peripheral section) of the lens section 2, an improvement in image quality due to an improvement in the light shielding property can be achieved.

The concrete shapes and structures of respective parts illustrated in the best mode of the above-described invention are each a mere example of embodiment in carrying out the present invention, and the technical scope of the present invention is not to be construed in a restricted manner by these concrete shapes and structures.

What is claimed is:

1. A lens barrel comprising:
a plurality of lenses separated from each other in a direction of an optical axis; and
a lens retaining body that retains the lenses;
wherein a print pattern is formed on a portion of a lens body section and a lens flange section of at least one of said plurality of lenses, and
a thickness of a portion of the print pattern formed on the portion of the lens body section is different than a thickness of a portion of the print pattern formed on the lens flange section.

2. The lens barrel according to claim 1,
wherein the lens body section of the lens on which said print pattern is formed is transmits rays of light and the flange section of the lens on which said print pattern is formed juts out from a peripheral section of said lens body section.

3. The lens barrel according to claim 1,
wherein said print pattern is formed by an ultraviolet curing ink.

4. The lens barrel according to claim 1,
wherein said print pattern is used as an adhesive for bonding together said lens retaining body and the lens on which said print pattern is formed.

5. The lens barrel according to claim 4,
wherein a storing concave part that stores said print pattern used as said adhesive is formed in a part adjacent to a periphery of said lens in said lens retaining body.

6. The lens barrel according to claim 1,
wherein a plurality of lens holders are used as said lens retaining body,
a first lens holder and a second lens holder retain said lens on which said print pattern is formed by sandwiching said lens from the direction of the optical axis,
a predetermined lens is retained by said second lens holder, and
a space configured to tolerate a tilt of said second lens holder with respect to the direction of said optical axis is formed between said first lens holder and said second lens holder.

7. The lens barrel according to claim 6,
wherein the tilt of said second lens holder with respect to said first lens holder is set by a thickness of said print pattern formed on said lens, and
a tilt of the predetermined lens retained by said second lens holder with respect to said optical axis is configured to be adjusted.

8. An image pickup unit comprising:
a plurality of lenses separated from each other in a direction of an optical axis;
a lens retaining body that retrains the lenses; and
an image pickup element for converting image pickup light captured as an image pickup signal via said plurality of lenses into an image signal;
wherein a print pattern is formed on a portion of a lens body section and a lens flange section of at least one of said plurality of lenses, and
a thickness of a portion of the print pattern formed on the portion of the lens body section is different than a thickness of a portion of the print pattern formed on the lens flange section.

9. The image pickup unit according to claim 8,
wherein the lens body section of the lens on which said print pattern is formed is transmits rays of light and the flange section of the lens on which said print pattern juts out from a peripheral section of said lens body section.

10. The image pickup unit according to claim 8,
wherein said print pattern is formed by an ultraviolet curing ink.

11. The image pickup unit according to claim 8,
wherein said print pattern is used as an adhesive for bonding together said lens retaining body and the lens on which said print pattern is formed.

12. The image pickup unit according to claim 11,
wherein a storing concave part that stores said print pattern used as said adhesive is formed in a part adjacent to a periphery of said lens in said lens retaining body.

13. The image pickup unit according to claim 8,
wherein a plurality of lens holders are used as said lens retaining body,
a first lens holder and a second lens holder retain said lens on which said print pattern is formed by sandwiching said lens from the direction of the optical axis,
a predetermined lens is retained by said second lens holder, and
a space configured to tolerate a tilt of said second lens holder with respect to the direction of said optical axis is formed between said first lens holder and said second lens holder.

14. The image pickup unit according to claim 13,
wherein the tilt of said second lens holder with respect to said first lens holder is set by a thickness of said print pattern formed on said lens, and
a tilt of the predetermined lens retained by said second lens holder with respect to said optical axis is configured to be adjusted.

15. The lens barrel according to claim 1,
wherein the print pattern is partly in contact with said lens retaining body and is configured to adjust an interval between the lenses in the direction of said optical axis.

16. The lens barrel according to claim 1,
wherein the lens flange section includes a projecting section that projects in a direction parallel to the optical axis, and
a thickness of a portion of the print pattern formed on the projecting section is different than a portion of the print pattern formed on a portion of the flange section that is not a projecting section.

17. The image pickup unit according to claim 8,
wherein the print pattern is partly in contact with said lens retaining body and is configured to adjust an interval between the lenses in the direction of said optical axis.

18. The image pickup unit according to claim 8,
wherein the lens flange section includes a projecting section that projects in a direction parallel to the optical axis, and
a thickness of a portion of the print pattern formed on the projecting section is different than a portion of the print pattern formed on a portion of the flange section that is not a projecting section.

19. The lens barrel according to claim 1,
wherein the print pattern is configured to shield light.

20. The image pickup unit according to claim 1,
wherein the print pattern is configured to shield light.

* * * * *